US010387090B2

(12) United States Patent
Hikichi

(10) Patent No.: US 10,387,090 B2
(45) Date of Patent: Aug. 20, 2019

(54) SYSTEM, CONTROL APPARATUS, AND CONTROL METHOD THAT CONTROL AN INDICATING PATTERN OF AN INDICATOR LIGHT CONNECTED TO AN IMAGE FORMING APPARATUS

(71) Applicant: CANON KABUSHIKI KAISHA, Tokyo (JP)

(72) Inventor: Yukiyoshi Hikichi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/658,692

(22) Filed: Jul. 25, 2017

(65) Prior Publication Data

US 2018/0039462 A1 Feb. 8, 2018

(30) Foreign Application Priority Data

Aug. 4, 2016 (JP) ................................ 2016-154021

(51) Int. Cl.
*G06F 3/12* (2006.01)

(52) U.S. Cl.
CPC .......... *G06F 3/1259* (2013.01); *G06F 3/1207* (2013.01); *G06F 3/1273* (2013.01); *G06F 3/1286* (2013.01); *G06F 3/1294* (2013.01)

(58) Field of Classification Search
None
See application file for complete search history.

(56) References Cited

U.S. PATENT DOCUMENTS

2010/0177345 A1* 7/2010 Watanabe ............ G06F 3/1205 358/1.15
2015/0055168 A1* 2/2015 Kato .................... G06F 3/1222 358/1.15
2016/0253137 A1* 9/2016 Nakao .................. G06F 3/1238 358/1.14
2017/0161002 A1* 6/2017 Weksler ............... G06F 3/1204
2018/0025185 A1* 1/2018 Hattrup ............... G06K 15/024 235/375

FOREIGN PATENT DOCUMENTS

JP 2006-254042 A 9/2006

* cited by examiner

*Primary Examiner* — Henok Shiferaw
(74) *Attorney, Agent, or Firm* — Venable LLP

(57) ABSTRACT

A control apparatus has a processor that executes instructions, stored in a memory, to receive a selection of a job from a job list indicating one or more jobs that are executed by one or more image forming apparatuses, to specify destination information corresponding to the selected job, and to transmit control information, based on the specified destination information, to an image forming apparatus, of the one or more image forming apparatuses, corresponding to the selected job, to control an indicating pattern of an indicator light connected to the image forming apparatus corresponding to the selected job. Each image forming apparatus has a processor that executes instructions, stored in a memory, to receive the control information transmitted from the control apparatus, and to control the indicating pattern of the indicator light connected to the image forming apparatus.

25 Claims, 16 Drawing Sheets

F I G. 2B
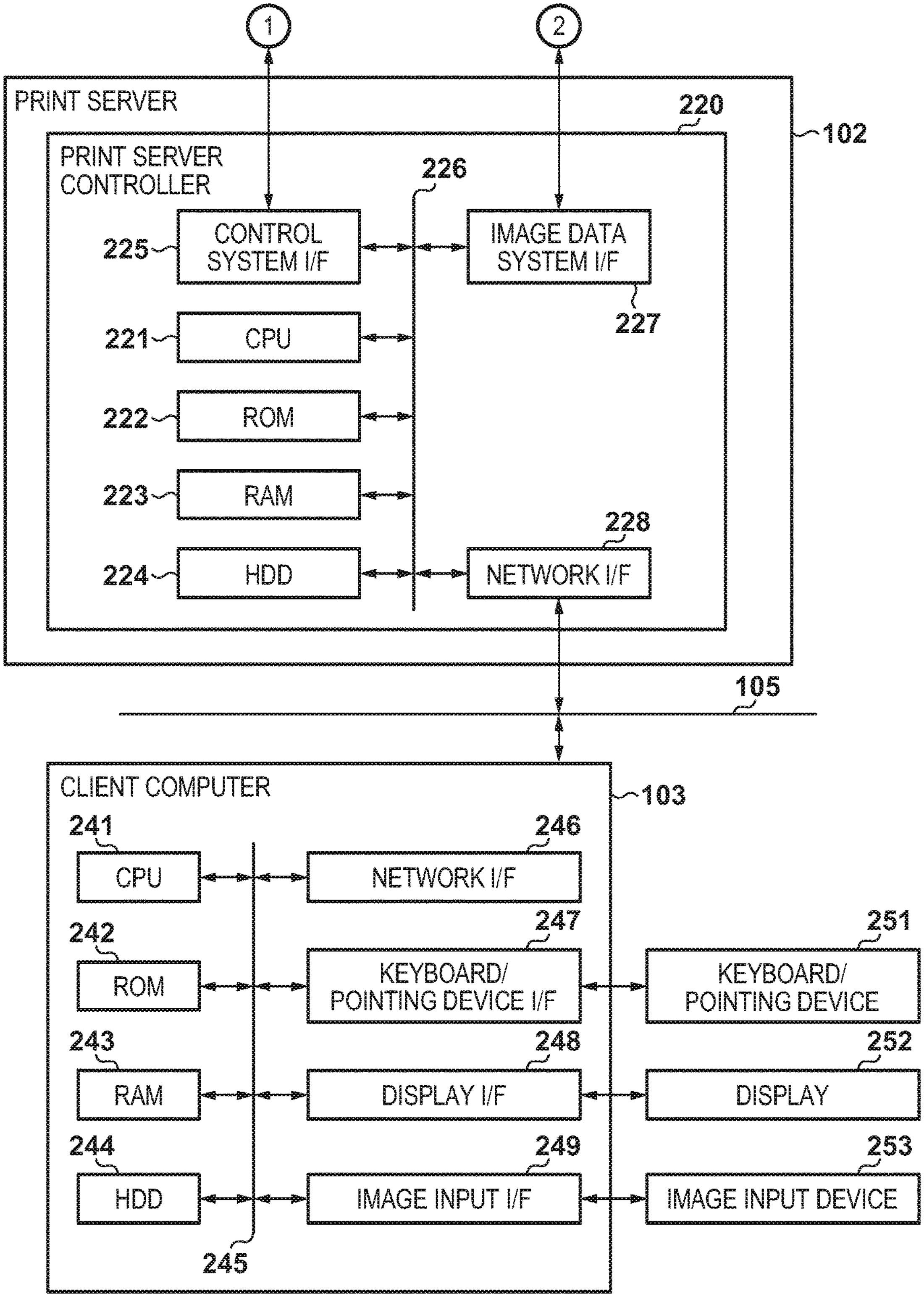

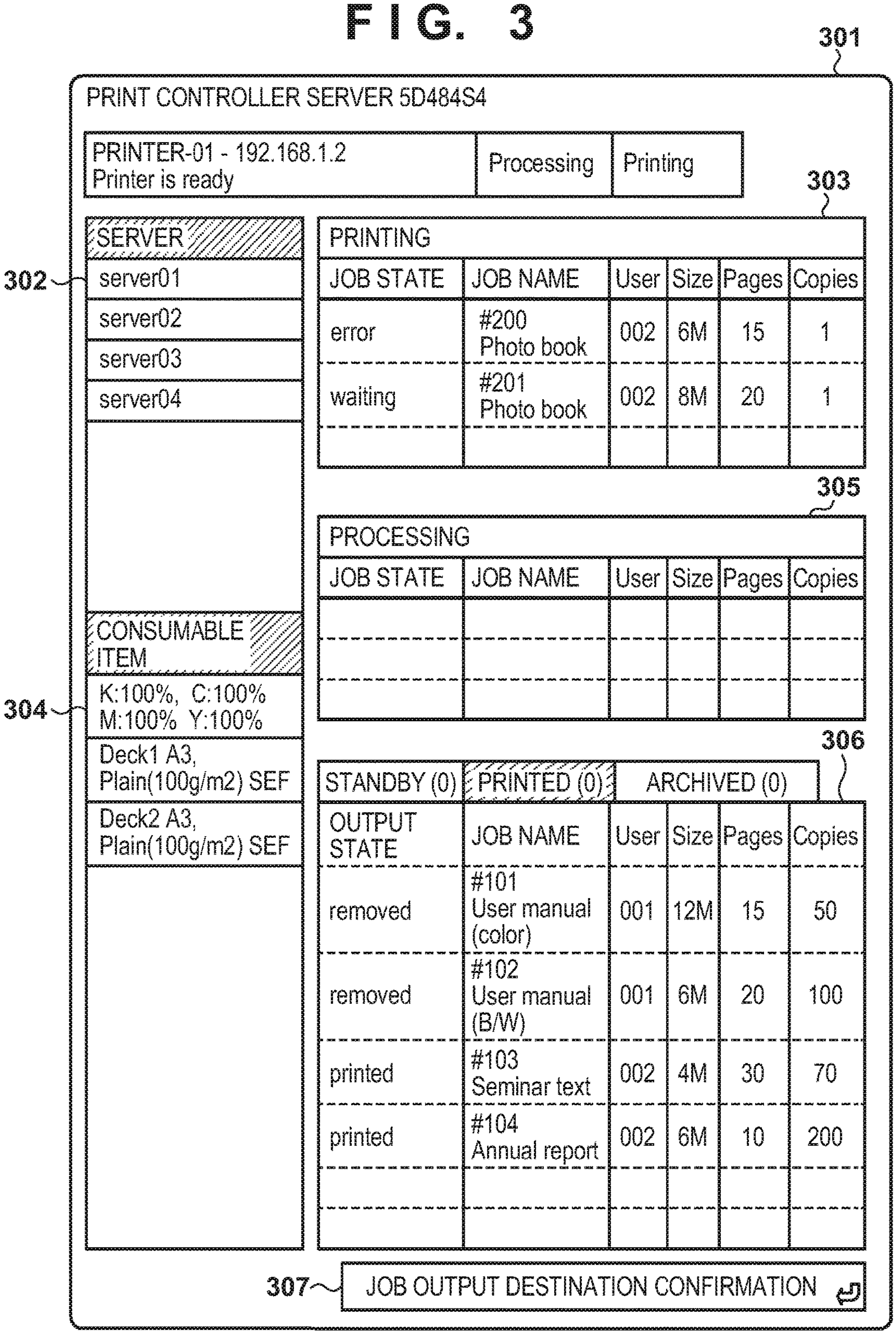

FIG. 3

PRINT CONTROLLER SERVER 5D484S4 — 301

| PRINTER-01 - 192.168.1.2 Printer is ready | Processing | Printing |

303

SERVER — 302

- server01
- server02
- server03
- server04

PRINTING

| JOB STATE | JOB NAME | User | Size | Pages | Copies |
|---|---|---|---|---|---|
| error | #200 Photo book | 002 | 6M | 15 | 1 |
| waiting | #201 Photo book | 002 | 8M | 20 | 1 |

305

PROCESSING

| JOB STATE | JOB NAME | User | Size | Pages | Copies |
|---|---|---|---|---|---|
| | | | | | |

CONSUMABLE ITEM — 304

K:100%, C:100%
M:100% Y:100%

Deck1 A3, Plain(100g/m2) SEF

Deck2 A3, Plain(100g/m2) SEF

306

STANDBY (0) | PRINTED (0) | ARCHIVED (0)

| OUTPUT STATE | JOB NAME | User | Size | Pages | Copies |
|---|---|---|---|---|---|
| removed | #101 User manual (color) | 001 | 12M | 15 | 50 |
| removed | #102 User manual (B/W) | 001 | 6M | 20 | 100 |
| printed | #103 Seminar text | 002 | 4M | 30 | 70 |
| printed | #104 Annual report | 002 | 6M | 10 | 200 |

307 — JOB OUTPUT DESTINATION CONFIRMATION

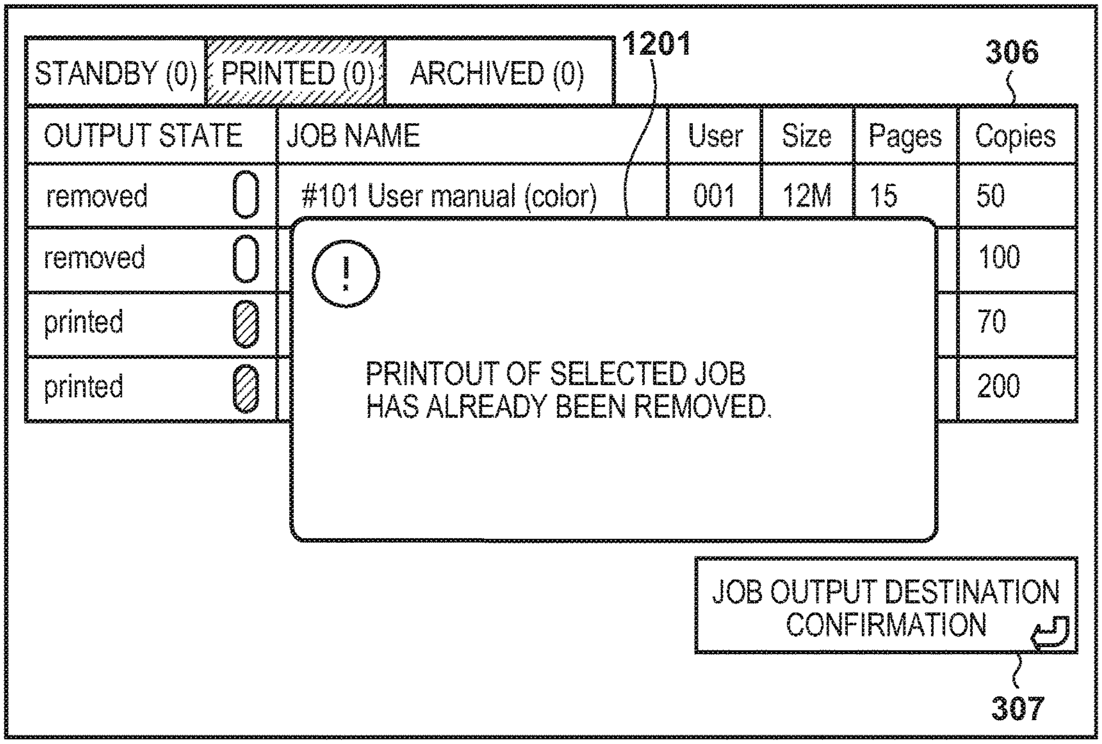

FIG. 12A

| OUTPUT STATE | JOB NAME | User | Size | Pages | Copies |
|---|---|---|---|---|---|
| removed | #101 User manual (color) | 001 | 12M | 15 | 50 |
| removed | | | | | 100 |
| printed | | | | | 70 |
| printed | | | | | 200 |

STANDBY (0) | PRINTED (0) | ARCHIVED (0) — 1201, 306

PRINTOUT OF SELECTED JOB HAS ALREADY BEEN REMOVED.

JOB OUTPUT DESTINATION CONFIRMATION — 307

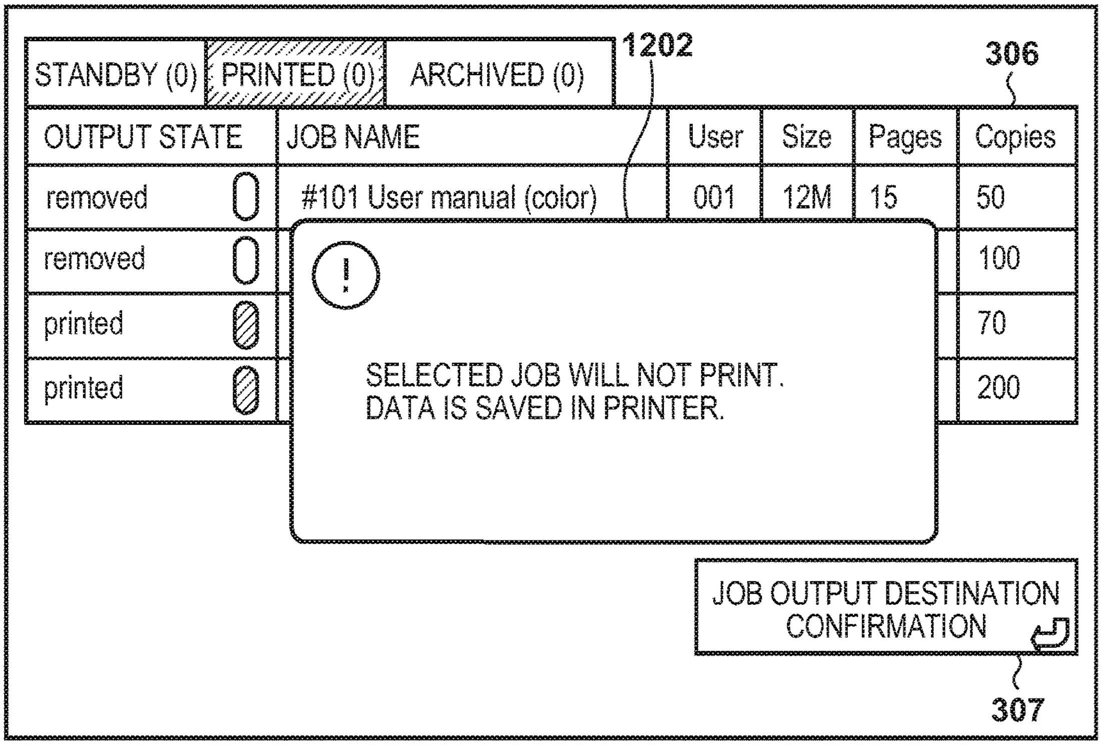

FIG. 12B

| OUTPUT STATE | JOB NAME | User | Size | Pages | Copies |
|---|---|---|---|---|---|
| removed | #101 User manual (color) | 001 | 12M | 15 | 50 |
| removed | | | | | 100 |
| printed | | | | | 70 |
| printed | | | | | 200 |

STANDBY (0) | PRINTED (0) | ARCHIVED (0) — 1202, 306

SELECTED JOB WILL NOT PRINT. DATA IS SAVED IN PRINTER.

JOB OUTPUT DESTINATION CONFIRMATION — 307

F I G. 14
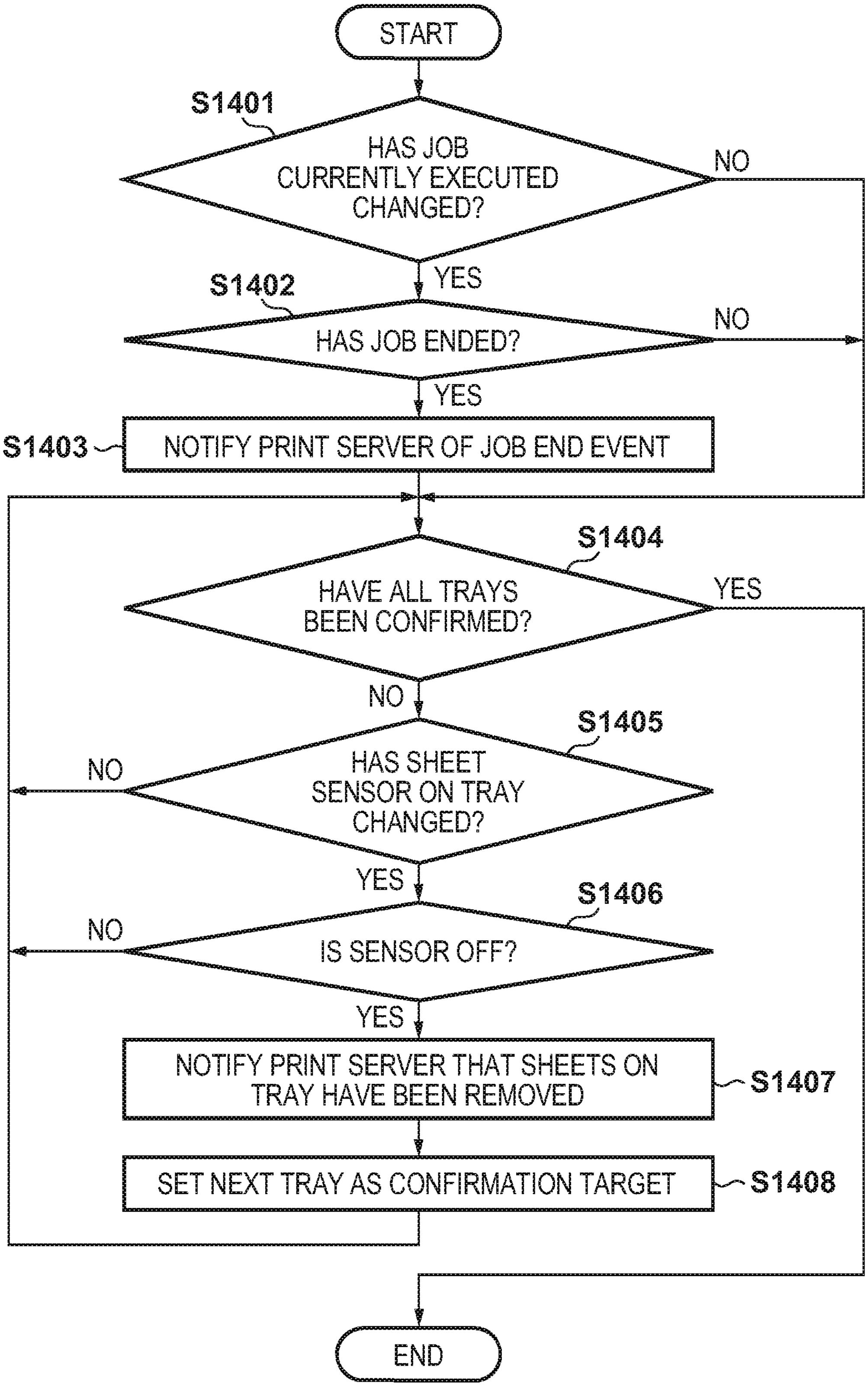

SYSTEM, CONTROL APPARATUS, AND CONTROL METHOD THAT CONTROL AN INDICATING PATTERN OF AN INDICATOR LIGHT CONNECTED TO AN IMAGE FORMING APPARATUS

This application claims the benefit of Japanese Patent Application No. 2016-154021, filed on Aug. 4, 2016, which is hereby incorporated by reference herein in its entirety.

BACKGROUND OF THE INVENTION

Field of the Invention

The present invention relates to a system including an image forming apparatus and a control apparatus for controlling the image forming apparatus, the control apparatus, and a control method.

Description of the Related Art

Unlike office printers, a plurality of digital printers used in production printing are often installed in a dedicated area. To properly use monochrome printing and color printing, or to print by distributing a large number of printed products, a plurality of digital printers are used. A digital printer requires no labor for changing a plate, and one operator may manage a plurality of printers. A print job can be remotely input from the client computer of an operator. The operator is often absent near the printer, except when a printed product is recovered upon completion of printing, or when an operation for restoring a state in which the printer cannot operate due to some factor is performed. In order for the operator to know the status of the printer from a remote location, an arrangement of allowing the operator to know a state, such as occurrence of an error during printing, a paper jam, or a paper outage, by an indicator light unit connected to the printer is adopted.

The operator performs a print job input operation, a job editing operation, and a job history reference operation for a plurality of digital printers using print job management software or a printer driver. When the operator is a beginner or a printer is replaced, if the print job management software or the printer driver is used, the operator may select a wrong printer. In this case, the operator cannot obtain a printout from a desired printer.

Japanese Patent Laid-Open No. 2006-254042 describes a technique of allowing an operator to confirm, when designating a printer on a network, that the intended printer is correctly selected. In Japanese Patent Laid-Open No. 2006-254042, a command "output destination confirmation" is provided in a printer driver, and, when the operator selects the command, the printer notifies, using an emitter or a loudspeaker, the operator that the printer has been selected.

Although the operator can confirm an output destination printer before inputting a print job, the operator cannot designate an arbitrary job in a list of printed job histories or printing jobs and confirm a print output destination. That is, when the operator who makes a plurality of apparatuses execute print jobs goes to get the printout of a job for which the end of printing has been recognized in the job histories, there is no way of confirming a printer on which the printout is stacked.

SUMMARY OF THE INVENTION

An aspect of the present invention is to eliminate the above-mentioned problems with the conventional technology. The present invention provides a system for making it possible to readily identify an image forming apparatus that holds a printout, a control apparatus, and a control method.

In one aspect, the present invention provides a system comprising an image forming apparatus and a control apparatus configured to control the image forming apparatus, the control apparatus including a selection unit configured to select a job from job histories, and a transmission unit configured to transmit, to the image forming apparatus corresponding to the job selected by the selection unit, a signal for making it possible to identify the image forming apparatus, and the image forming apparatus including an indicator light, a reception unit configured to receive the signal transmitted by the transmission unit, and a control unit configured to control turn-on of the indicator light based on the signal received by the reception unit.

According to the present invention, it is possible to readily identify an image forming apparatus that holds a printout.

Further features of the present invention will become apparent from the following description of exemplary embodiments with reference to the attached drawings.

BRIEF DESCRIPTION OF THE DRAWINGS

FIGS. 2A and 2B are block diagrams showing the hardware arrangements of respective apparatuses.

FIG. 3 is a view showing the operation screen of print job management software.

FIGS. 12A and 12B are views each showing a warning screen.

FIG. 14 is a flowchart illustrating processing of detecting removal of sheets on an output tray.

DESCRIPTION OF THE EMBODIMENTS

Figure 1:
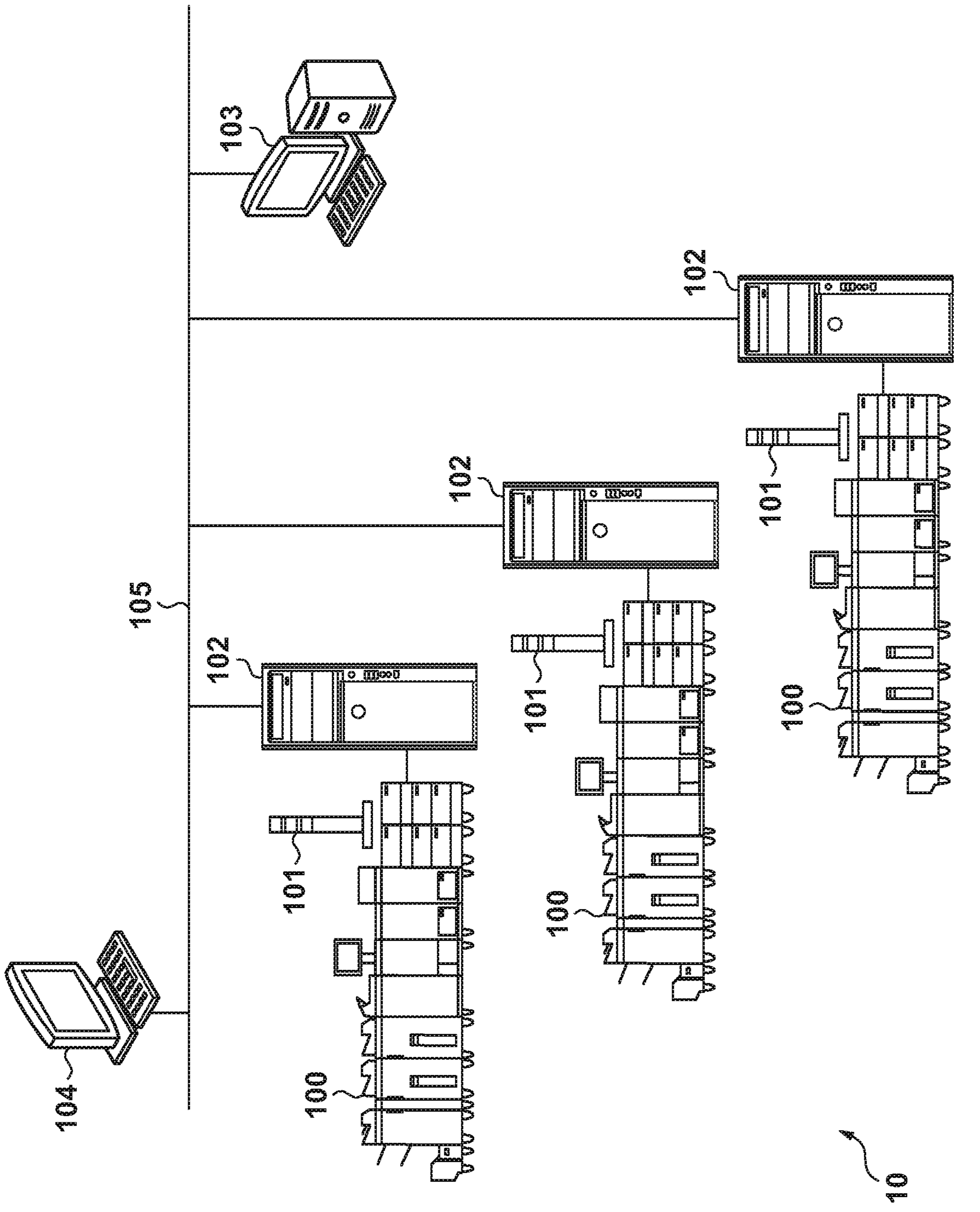
FIG. 1 is a view showing the configuration of a print control system.

Preferred embodiments of the present invention will now be described hereafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components and a description thereof will be omitted.

First Embodiment

FIG. 1 is a view showing the configuration of a print control system 10 according to this embodiment. A printer 100 shown in FIG. 1 is an image forming apparatus for forming an image on a printing medium. In this embodiment, the printer 100 is, for example, a multi-function printer (MFP) capable of scanning an original paper sheet, printing a document, and transmitting an image, or a single-function printer (SFP) capable of executing a print function. A print server 102 is connected to the printer 100. The printer 100 receives image data and a print command, such as finishing processing parameters, from the print server 102, and creates a printed product, such as a paper medium. In this embodiment, an indicator light unit 101 for displaying the operating status of the printer 100 by light flickering, or the like, is connected to the printer 100. The indicator light unit 101 will be described later.

The print server 102 is a controller for managing a print job. The user of the print control system 10 transmits a desired document file from a client computer 103 or 104 to the print server 102. Unless otherwise specified, the client computer 103 will be described below as a representative example of the client computers 103 and 104. The print server 102 converts the received document file into image data processable by the printer 100 (Raster Image Processing (RIP)), and transmits the image data to the printer 100 by adding attributes of imposition or finishing processing to create a printed product. Furthermore, the print server 102 has an image processing function of saving/reusing an executed print job or performing color conversion.

In a production printing market, such as various kinds of printing in small quantities in a print shop, or in-house printing in a big company, in many cases, a plurality of printers 100 and a plurality of print servers 102 are communicably connected to each other on a local network 105, as shown in FIG. 1. Using the plurality of printers 100 shown in FIG. 1, it is possible to properly use color/monochrome printing and to shorten a printed product creation time by distributing and printing many jobs.

Figure 2A:
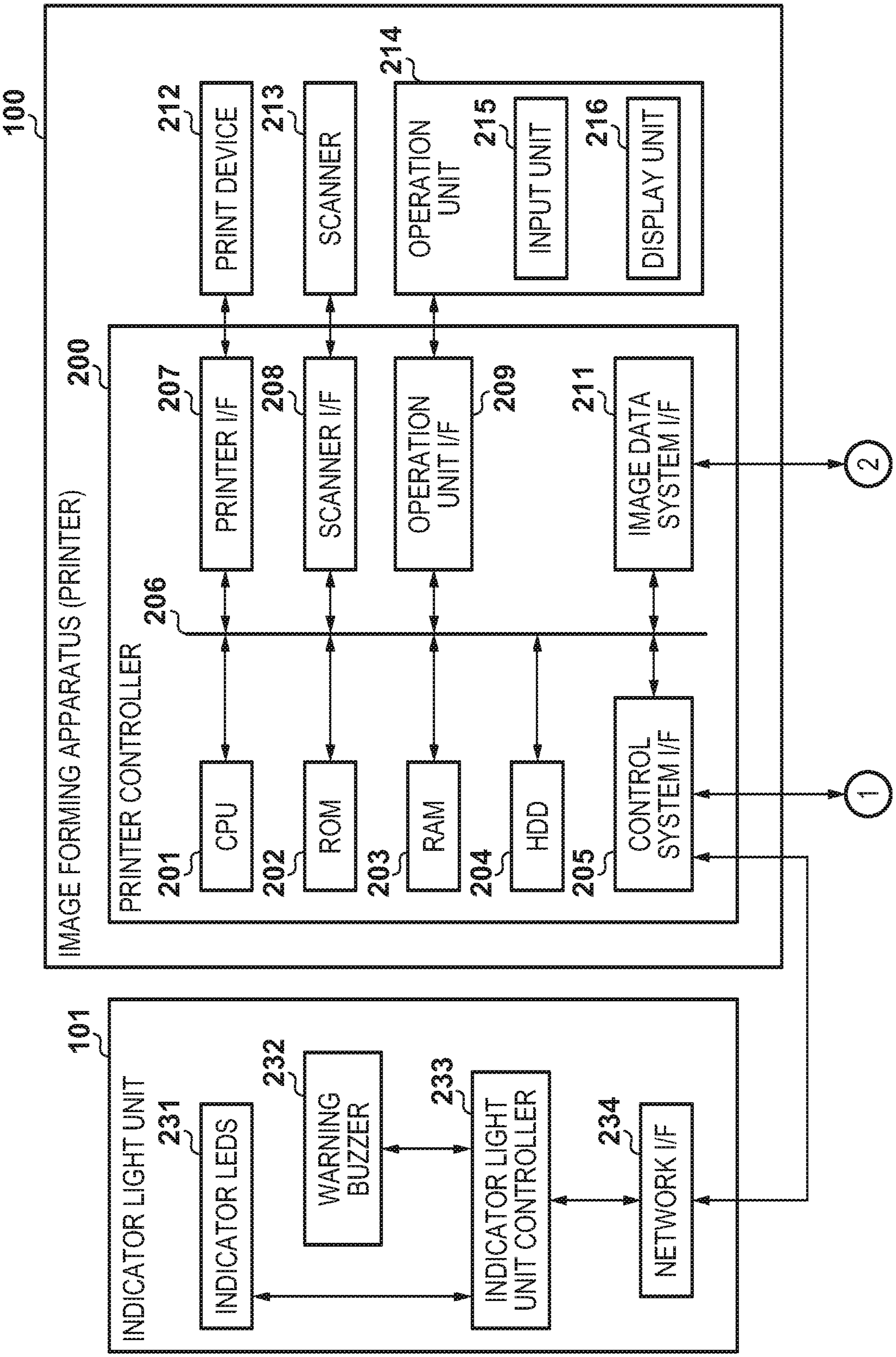

FIGS. 2A and 2B are block diagrams showing the hardware arrangement of the respective apparatuses of the print control system 10. A printer controller 200 controls the printer 100. The printer controller 200 includes a plurality of hardware units. A central processing unit (CPU) 201 comprehensively controls access to various devices connected to a system bus 206 based on a control program stored in a read only memory (ROM) 202 or a hard disk (HDD) 204. The ROM 202 stores a control program executable by the CPU 201, and the like. A random-access memory (RAM) 203 mainly functions as a main memory, a work area, or the like, of the CPU 201, and is configured to increase the memory capacity by an optional RAM connected to an expansion port (not shown). The HDD 204 stores a boot program, various applications, font data, user files, edit files, and the like.

Note that, in this embodiment, the HDD 204 is used as an external storage device. Instead of the HDD 204, however, a secure digital (SD) card, a flash memory, or the like, may be used as an external storage device. A scanner interface (I/F) 208 controls an image input operation from a scanner 213. A printer I/F 207 controls an image output operation to a print device 212. An operation unit I/F 209 controls display of a display unit 216, such as a panel, included in an operation unit 214, and input of various kinds of setting information set by an input unit 215. A control system I/F 205 receives, from the print server 102, information necessary for image formation. An image data system I/F 211 receives, from the print server 102, image data to be transmitted to the print device 212. Note that the printer 100 communicates with the local network 105 via the print server 102. At this time, the control system I/F 205 transmits/receives data communicated with the local network 105. The remaining printers 100 connected to the local network 105 to which the print server 102 belongs have the same hardware arrangement as that described above.

The indicator light unit 101 is connected to the printer 100 via a network I/F 234. An indicator light unit controller 233 controls the indicator light unit 101. The indicator light unit controller 233 indicates the state of the printer 100 by turning on indicator light-emitting diodes (LEDs) 231, and issues a warning by a sound using a warning buzzer 232, as needed.

In the print server 102, a print server controller 220 performs processing, such as analysis of input print job data and processing of rasterization into image data, necessary to execute print processing in the print server 102. A CPU 221 comprehensively controls access to various devices connected to a system bus 226 based on a control program stored in a ROM 222 or an HDD 224. The ROM 222 stores a control program executable by the CPU 221, and the like. A RAM 223 mainly functions as a main memory, a work area, or the like, of the CPU 221, and is configured to increase the memory capacity by an optional RAM connected to an expansion port (not shown).

The HDD 224 stores a boot program, various applications, font data, user files, edit files, and the like. Note that, in this embodiment, the HDD 224 is used as an external storage device. Instead of the HDD 224, however, an SD card, a flash memory, or the like, may be used as an external storage device. A control system I/F 225 transmits, to the printer 100, information necessary for image formation. The control system I/F 225 transmits/receives a print job data file to/from the printer 100. An image data system I/F 227 transmits, to the printer 100, image data to be output from the print device 212. A network I/F 228 performs data communication with the local network 105 via a network cable.

As described above, the print server 102 relays communication between the printer 100 and the local network 105. At this time, the control system I/F 225 performs data communication with the printer 100, and the network I/F 228 performs data communication with the local network 105. That is, the print server 102 operates like a network bridge.

In the client computer 103, a CPU 241 comprehensively controls access to various input/output devices connected to a system bus 245 based on a control program stored in a ROM 242 or an HDD 244. The ROM 242 stores a control program executable by the CPU 241, and the like. A RAM 243 mainly functions as a main memory, a work area, or the like, of the CPU 241, and is configured to increase the memory capacity by an optional RAM connected to an expansion port (not shown). The hard disk (HDD) 244 stores a boot program, various applications, font data, user files, edit files, and the like.

Note that, in this embodiment, the HDD 244 is used as an external storage device. Instead of the HDD 244, however, an SD card, a flash memory, or the like, may be used as an external storage device. A network I/F 246 performs data communication with the local network 105 via a network cable. A keyboard/pointing device I/F 247 controls a key input operation from a keyboard/pointing device 251, and a coordinate/click input operation from a pointing device. A display I/F 248 controls display of a display 252. An image input I/F 249 controls an image input operation from an image input apparatus 253, such as a camera. As described above, the client computer 103 communicates with the printer 100 via the print server 102. At this time, however, data communication is controlled by the network I/F 246.

Before a description of the processing of the print control system 10 according to this embodiment, the operation screen of print job management software operating on the client computer 103, which is displayed on a monitor, will be explained. FIG. 3 is a view showing an example of the operation screen of the print job management software. Print job management software 301 can operate on the print server 102 and all client computers, such as the client computer 103 connected to the local network 105.

The user of the print control system 10 can confirm the state of a print job managed by the print server 102 and the state of the printer 100 using the operation screen of the print job management software 301. Various kinds of information are displayed in the respective display areas of the operation screen of the print job management software 301. For example, as shown in FIG. 3, a print server list display portion 302 and a consumable item display portion 304 are displayed on the left side of the screen. A printing job list 303, an RIP job list 305, and a printed job list 306 are displayed as a list of histories in the central portion of the screen. It is possible to accept selection of a job displayed in the job lists, and to edit job attributes, such as the number of copies and a finishing method of the selected job. A job output destination confirmation button 307 is displayed on the lower right corner of the screen. When selection of a job in each job list is accepted, and the job output destination confirmation button 307 is pressed, indication of the indicator light unit 101 of the printer 100 as the printed product output destination of the selected job is controlled.

The software arrangement of the print control system 10 according to this embodiment will be described with reference to FIGS. 4A to 4C.

Figure 4A:
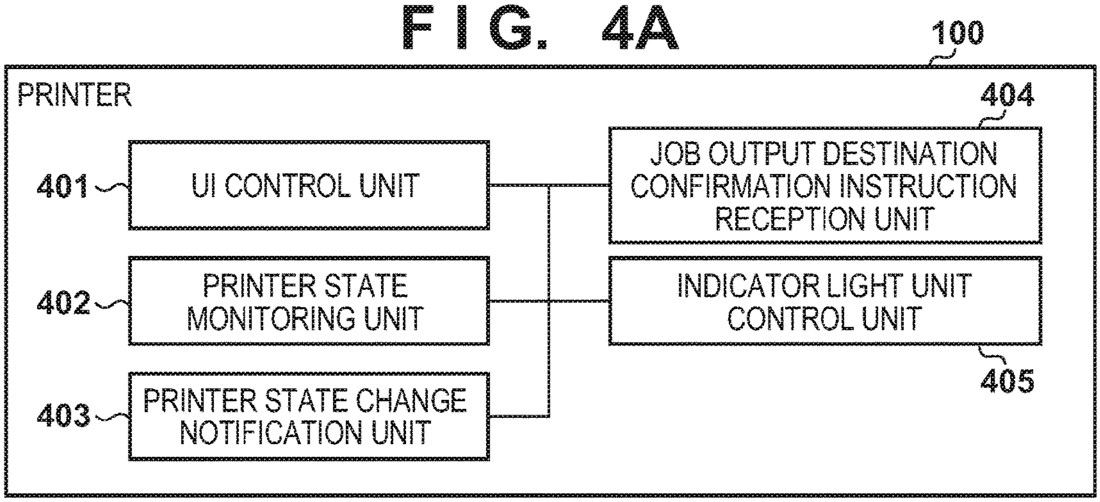
FIGS. 4A to 4C are block diagrams respectively showing software module arrangements.

FIG. 4A is a block diagram showing the software module arrangement of the printer 100. Software modules are implemented when the CPU 201 reads out programs stored in the HDD 204 into the RAM 203 and executes them.

A user interface (UI) control unit 401 accepts, via the operation unit I/F 209, display control of the display unit 216 and user operation input processing performed using the input unit 215. A printer state monitoring unit 402 monitors the apparatus status of the printer 100 and the state of a print job executed internally. If the state of the printer 100 changes, a printer state change notification unit 403 notifies the print server 102 of information about the printer 100. For example, the printer state change notification unit 403 notifies the print server 102 of a change in remaining amount of a consumable item, such as ink, the stacked sheet amount on the tray, the progress of a job, and the like. An indicator light unit control unit 405 controls the indicator light unit 101 connected to the printer 100. A job output destination confirmation instruction reception unit 404 receives a job output destination confirmation instruction command transmitted from the print job management software 301 operating on the client computer 103.

Figure 4B:
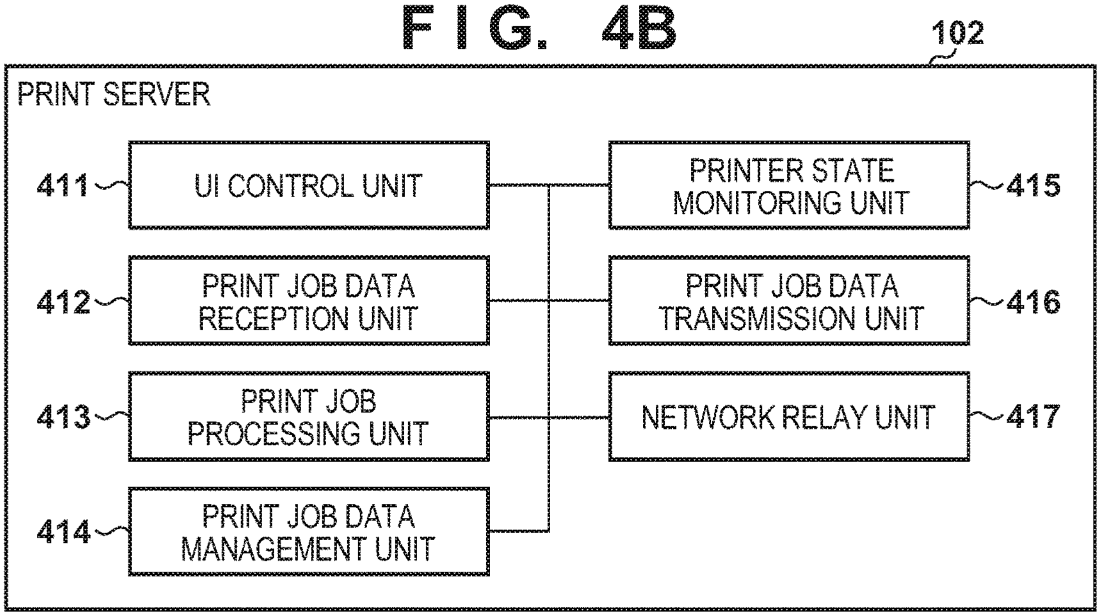

FIG. 4B is a block diagram showing the software module arrangement of the print server 102. Software modules are implemented when the CPU 221 reads out programs stored in the HDD 224 into the RAM 223 and executes the programs.

A UI control unit 411 controls display of a display (not shown) of the print server 102 and input from an input device, such as a keyboard. A print job data reception unit 412 receives print job data sent from the client computer 103. A print job processing unit 413 analyzes the print job data received by the print job data reception unit 412, and generates a control command for operating the printer 100 and image data to be used for printing. The print job processing unit 413 causes the printer 100 to execute print processing using the generated control command and image data. A print job data management unit 414 manages the print job data by saving the received print job data in the HDD 224, and creating an index to be able to perform reprinting or to extract the data.

A printer state monitoring unit 415 receives a printer state change notification transmitted from the printer 100, updates job information managed by the print job data management unit 414, and stores information about the remaining amount of a consumable item, such as ink of the printer 100. A print job data transmission unit 416 transmits, to the printer 100, the print job data managed by the print job data management unit 414. A network relay unit 417 relays network data received from the control system I/F 205 so that the printer 100 can access the local network 105 and data from the local network 105 is transmitted to the printer 100.

Figure 4C:
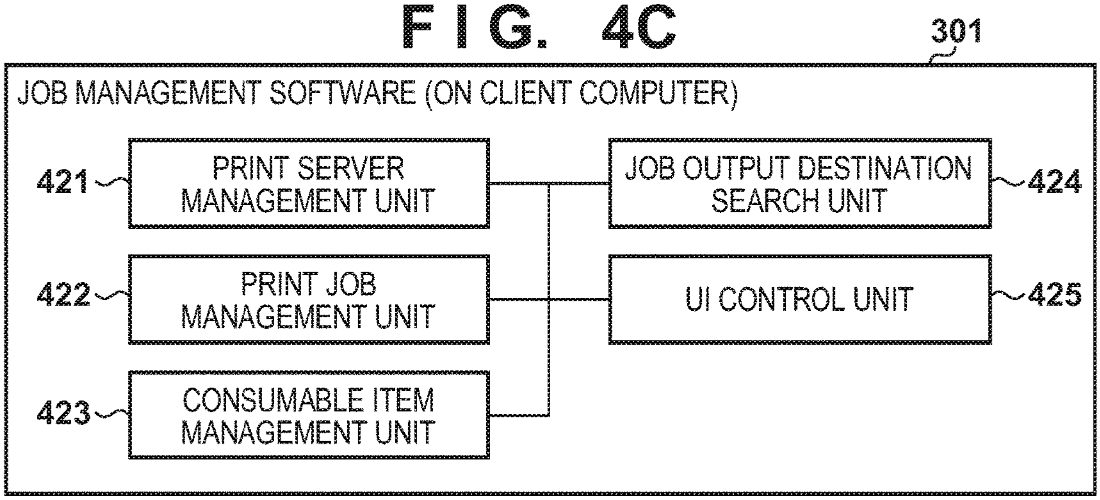

FIG. 4C is a block diagram showing the module arrangement of the print job management software 301 operating on the client computer 103. Software modules are implemented when the CPU 241 reads out programs stored in the HDD 244 into the RAM 243 and executes the programs.

A UI control unit 425 accepts an input operation of the keyboard 251 via the keyboard/pointing device I/F 247. The UI control unit 425 also displays information on the display 252 via the display I/F 248. A print server management unit 421 manages one or more print servers 102 monitored by the print job management software 301. The print server management unit 421 stores an internet protocol (IP) address of each print server 102, and also performs processing of, for example, establishing communication with the monitored print server 102. A print job management unit 422 manages a print job on the print server 102 as the monitoring target of the print job management software 301. The print job management unit 422 accepts print job data, such as a portable document format (PDF) file desired by the user of the print job management software 301. For example, when the UI control unit 425 accepts a drag-and-drop operation of a file by the user, a print job is input. The input print job is transmitted to the print server 102 via the print job management unit 422. The print job management unit 422 always updates the state of the managed print job. In response to a periodic inquiry by the print server 102 or an event notification from the printer 100 or the print server 102, the print job management unit 422 detects the progress of a job, discharge of a sheet to a printed product output destination tray, or removal of a sheet.

A consumable item management unit 423 monitors the consumable item information of the print server 102 monitored by the print job management software 301. The consumable item management unit 423 monitors, via the print server 102, the statuses of the consumable items of the printer 100, such as paper and toner, and displays the consumable item statuses on the display 252. A job output destination search unit 424 searches for the printer 100 to which the printout of the print job selected by the user is output. In this embodiment, turn-on of the indicator light unit 101 of the printer 100 corresponding to the output destination of the selected job is controlled. As a result, the user can readily identify the printer 100 as the output destination of the selected job by turn-on of the indicator light unit 101.

Figure 5:
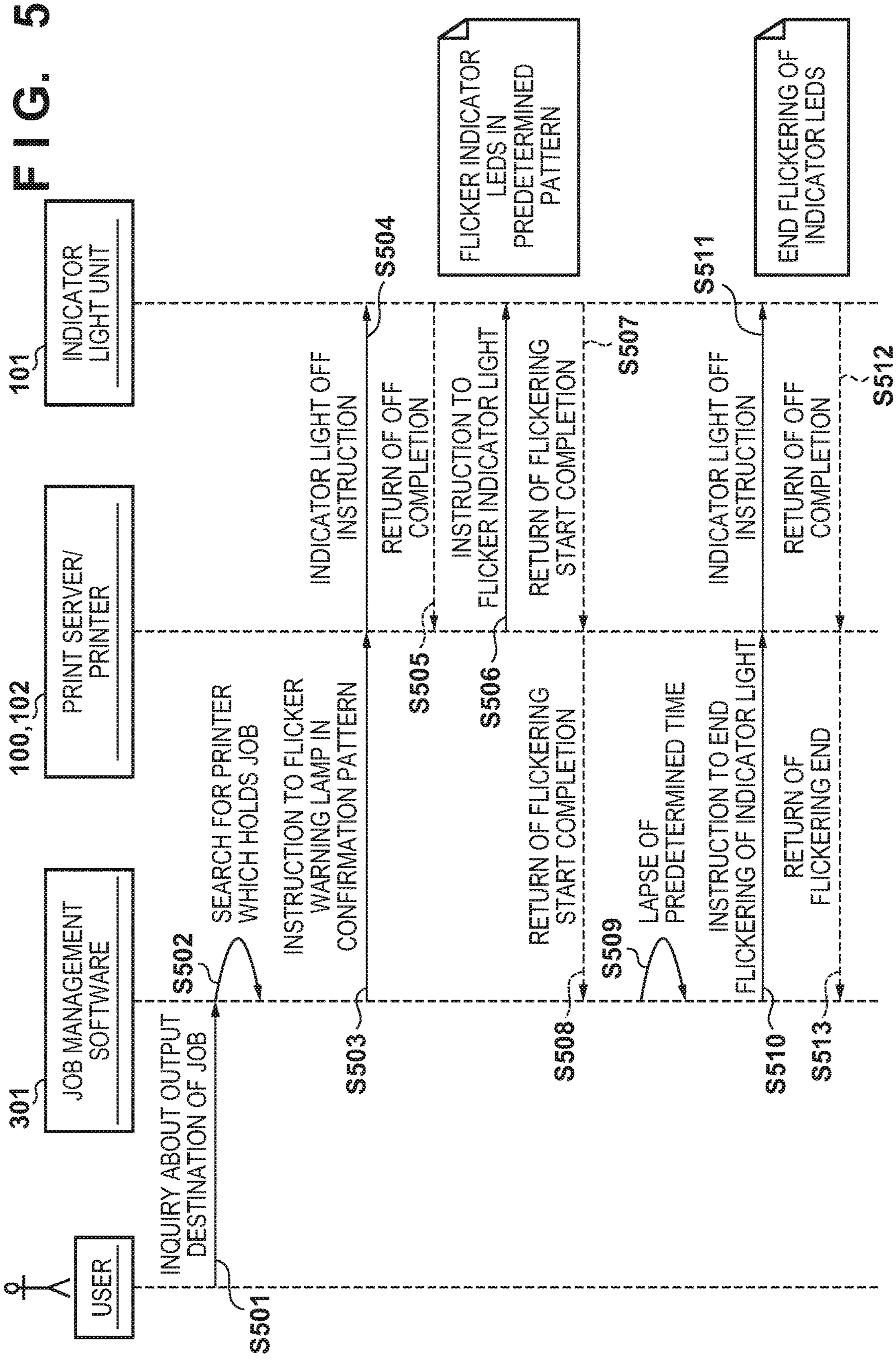
FIG. 5 is a sequence chart for explaining the overall procedure of the processing of the print control system.

The overall procedure of the processing of the print control system 10 according to this embodiment will be described below with reference to FIG. 5.

The client computer 103 causes the print job management software 301 to accept an inquiry about the output destination of the job by the user (S501). The client computer 103 causes the print job management software 301 to search for the network address of the print server 102 corresponding to the printer 100 as the output destination of the selected job (S502). As shown in FIG. 1, the printer 100 is connected to the print server 102 directly. The network relay unit 417 of the print server 102 allows the printer 100 to receive communication data from the local network 105. The client computer 103 causes the print job management software 301 to instruct, using the network address found in S502, the printer 100 as the job output destination to turn on the indicator light unit 101 in an output destination confirmation pattern (S503).

The relationship between the operation of the indicator light unit 101 and the state of the printer 100 will now be described with reference to Table 1. The indicator light unit 101 generally switches the turn-on indication of the indicator LEDs 231 in accordance with the state information of the printer 100. The indicator light unit 101 allows the user far away from the printer 100 to confirm the operation state of the printer 100.

If support by the operator is required to continue the job due to a failure, such as a paper jam or an incorrectly closed cover (an operator call occurs), the indicator light unit 101 flickers the red LED of the indicator LEDs 231, and generates a buzzer sound by the warning buzzer 232. If execution of the job does not become impossible immediately, for example, if the remaining toner amount decreases, the indicator light unit 101 turns on the yellow LED of the indicator LEDs 231. If the printer 100 is in a standby state in which printing is possible, the indicator light unit 101 turns on, for example, the green LED of the indicator LEDs 231. During print job execution or during adjustment, such as calibration, the indicator light unit 101 flickers, for example, the green LED of the indicator LEDs 231. In this embodiment, when confirming the job output destination, the indicator light unit 101 is controlled to flicker all of the green, yellow, and red LEDs of the indicator LEDs 231.

TABLE 1

| | Indicator LED, Operation of Buzzer | | | |
|---|---|---|---|---|
| State | Green | Yellow | Red | Buzzer |
| Operator Call | — | — | flickering | ON |
| Warning | — | ON | — | OFF |
| Standby | ON | — | — | OFF |
| Printing, Adjustment | flickering | — | — | OFF |
| Job Output Destination Confirmation | flickering | flickering | flickering | OFF |

Upon receiving a turn-on instruction signal of the indicator light unit 101 from the client computer 103, the print server 102 instructs to temporarily turn off the indicator LEDs 231 currently indicated in the indicator light unit 101 of the printer 100 (S504). After turning off the indicator LEDs 231 currently indicated, the indicator light unit 101 of the printer 100 notifies the print server 102 of turn-off completion (S505).

Upon receiving the turn-off completion notification from the printer 100, the print server 102 instructs to flicker the indicator LEDs 231 in accordance with the output destination confirmation pattern, for which the turn-on instruction has been issued, among the ON patterns of the indicator LEDs 231 described in table 1 (S506). After starting to flicker the indicator LEDs 231 in accordance with the output destination confirmation pattern, for which the turn-on instruction has been issued, the indicator light unit 101 of the printer 100 notifies the print server 102 of the flickering start (S507). At this time, the user can readily recognize, by flickering of the indicator LEDs 231, the printer 100 that serves as the output destination of the print job selected on the print job management software 301.

Upon receiving the flickering start notification from the printer 100, the print server 102 notifies the client computer 103 that the indicator light unit 101 has started to flicker in accordance with the output destination confirmation pattern (S508).

The client computer 103 causes the print job management software 301 to stand by until a sufficient predetermined time during which the user can confirm the job output destination elapses (S509). This time may be determined in advance. After the predetermined time elapses, the client computer 103 causes the print job management software 301 to instruct the print server 102 to end the flickering of the indicator LEDs 231 for job output destination confirmation (S510).

Upon receiving the instruction (end signal) to end the flickering of the indicator light unit 101 from the client computer 103, the print server 102 instructs to end the flickering of the indicator LEDs 231 of the indicator light unit 101 of the printer 100 (S511). After the end of the flickering of the indicator LEDs 231, the indicator light unit 101 of the printer 100 notifies the print server 102 of the flickering end (S512). Upon receiving the flickering end notification from the printer 100, the print server 102 notifies the client computer 103 that the indicator light unit 101 has ended the flickering (S513).

Figure 6:
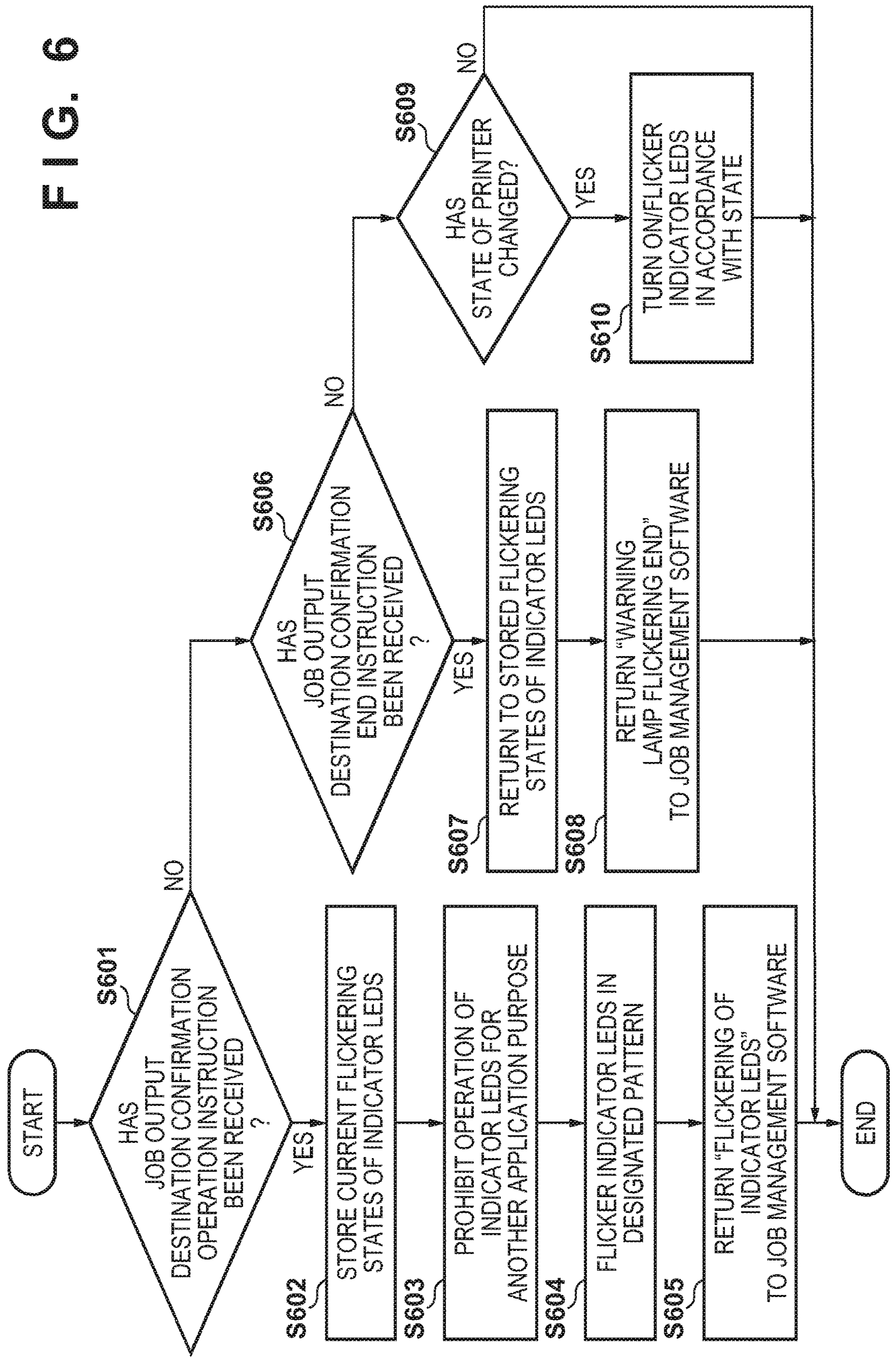
FIG. 6 is a flowchart illustrating the state update processing of an indicator light unit.

The state update processing of the indicator light unit 101 of the printer 100 will be described with reference to FIG. 6. Each process of FIG. 6 is implemented when the CPU 201 of the printer 100 reads out the program stored in the HDD 204 into the RAM 203 and executes the program.

The job output destination confirmation instruction reception unit 404 determines whether a job output destination confirmation instruction has been received from the print job management software 301 (step S601). This determination processing may be performed for every predetermined time. If it is determined that a job output destination confirmation instruction has been received, the following series of confirmation operations is performed.

To return, upon the end of the job output destination confirmation operation, the indication states of the indicator LEDs 231 to those before the start of the confirmation operation, the indicator light unit control unit 405 stores information of the current ON states of the indicator LEDs 231 in a storage unit, such as the RAM 203 (step S602). Next, the indicator light unit control unit 405 prohibits the use of the indicator LEDs 231 for another application purpose during the job output destination confirmation operation (step S603). The indicator light unit control unit 405 flickers the indicator LEDs 231 in the instructed output destination confirmation pattern among the flickering patterns of the indicator LEDs 231 in Table 1 (step S604). The job output destination confirmation instruction reception unit 404 notifies the print job management software 301 as the request source that the states of the indicator LEDs 231 have been updated (step S605 corresponding to S507). After that, the processing of FIG. 6 ends.

If it is determined in step S601 that no job output destination confirmation instruction has been received, the job output destination confirmation instruction reception unit 404 determines whether a job output destination confirmation end instruction has been received (step S606). If it is determined that a job output destination confirmation end instruction has been received, the following processing is performed.

The indicator light unit control unit 405 acquires, from the RAM 203, the information of the ON states of the indicator LEDs 231 stored in step S602, and turns on the indicator LEDs 231 based on the information of the ON states (step S607). The job output destination confirmation instruction reception unit 404 notifies the print job management software 301 that the ON states of the indicator LEDs 231 have been updated (step S608). After that, the processing of FIG. 6 ends.

If it is determined in step S606 that no job output destination confirmation end instruction has been received, the printer state monitoring unit 402 determines whether the state of the printer 100 has changed (step S609). If it is determined that the state of the printer 100 has changed due to, for example, occurrence of an operator call or a warning, the indicator light unit control unit 405 controls turn-on of the indicator LEDs 231 of the indicator light unit 101 in accordance with the contents in Table 1 (step S610). That is, the processes in steps S609 and S610 reflect the current state of the printer 100 on indication of the indicator LEDs 231. After that, the processing of FIG. 6 ends. If it is determined in step S609 that the state of the printer 100 has not changed, the processing of FIG. 6 ends.

Figure 7:
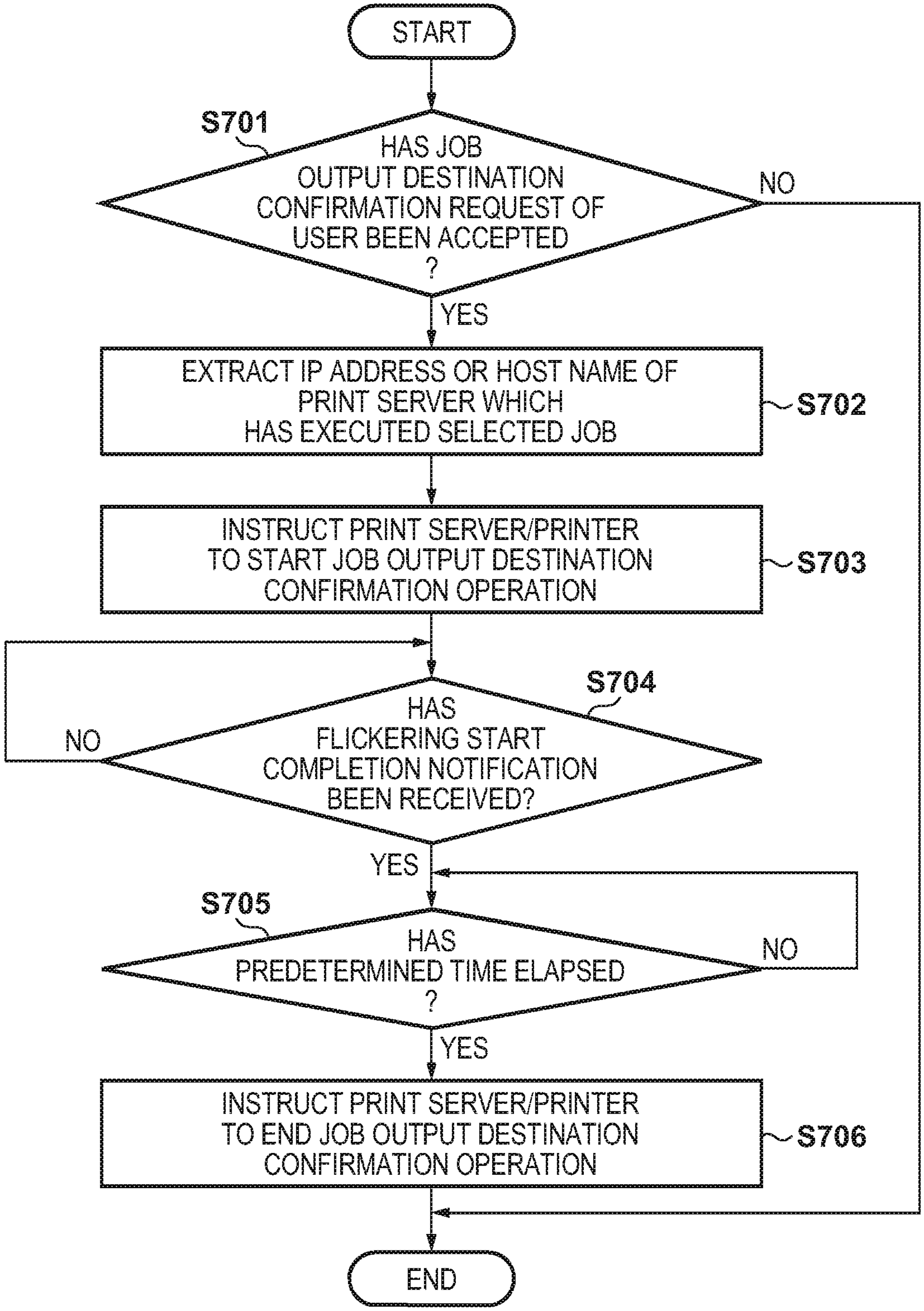
FIG. 7 is a flowchart illustrating job output destination confirmation processing.

The job output destination confirmation processing of the print job management software 301 will be described below with reference to FIG. 7. Each process of FIG. 7 is implemented when the CPU 241 of the client computer 103 reads out the program stored in the HDD 244 into the RAM 243 and executes the program.

The UI control unit 425 determines whether a job output destination confirmation request issued when the user presses the job output destination confirmation button 307 has been accepted (step S701). If it is determined that a job output destination confirmation request has been accepted, the print server management unit 421 searches for the network address or host name of the print server 102 that holds the job selected by the user (step S702 corresponding to S502). The job output destination search unit 424 instructs the found network address to perform a job output destination confirmation operation (step S703 corresponding to S503).

The print server management unit 421 determines whether a notification of flickering start completion according to the output destination confirmation pattern of the indicator light unit 101 has been received from the print server 102 (step S704). This determination processing may be performed for every predetermined time. If it is determined that no flickering start completion notification has been received, the processing in step S704 is repeated.

If it is determined that a flickering start completion notification has been received, the job output destination search unit 424 determines whether the predetermined time has elapsed (step S705 corresponding to S509). If it is determined that the predetermined time has not elapsed, the processing in step S705 is repeated.

If it is determined in step S705 that the predetermined time has elapsed, the job output destination search unit 424 instructs the print server 102 of the network address found in step S702 to end the job output destination confirmation operation (step S705 corresponding to S510).

As described above, according to this embodiment, the user can readily identify a printer that holds a printout.

Second Embodiment

In the first embodiment, the flickering pattern of the indicator LEDs 231 of the indicator light unit 101 is fixed. In this embodiment, control for using a different flickering method of an indicator light unit 101 for each user will be described. With this arrangement, when a plurality of users perform job output destination confirmation at the same time, a plurality of indicator light units 101 flicker in different flickering patterns. Thus, each user can discriminate a selected printer. Furthermore, in this embodiment, a user interface of the same flickering pattern as the flickering pattern of the indicator light unit 101 is displayed on print job management software 301. As a result, the user can more reliably identify a printer that the user is searching for. The difference from the first embodiment will be described below.

Figure 8:
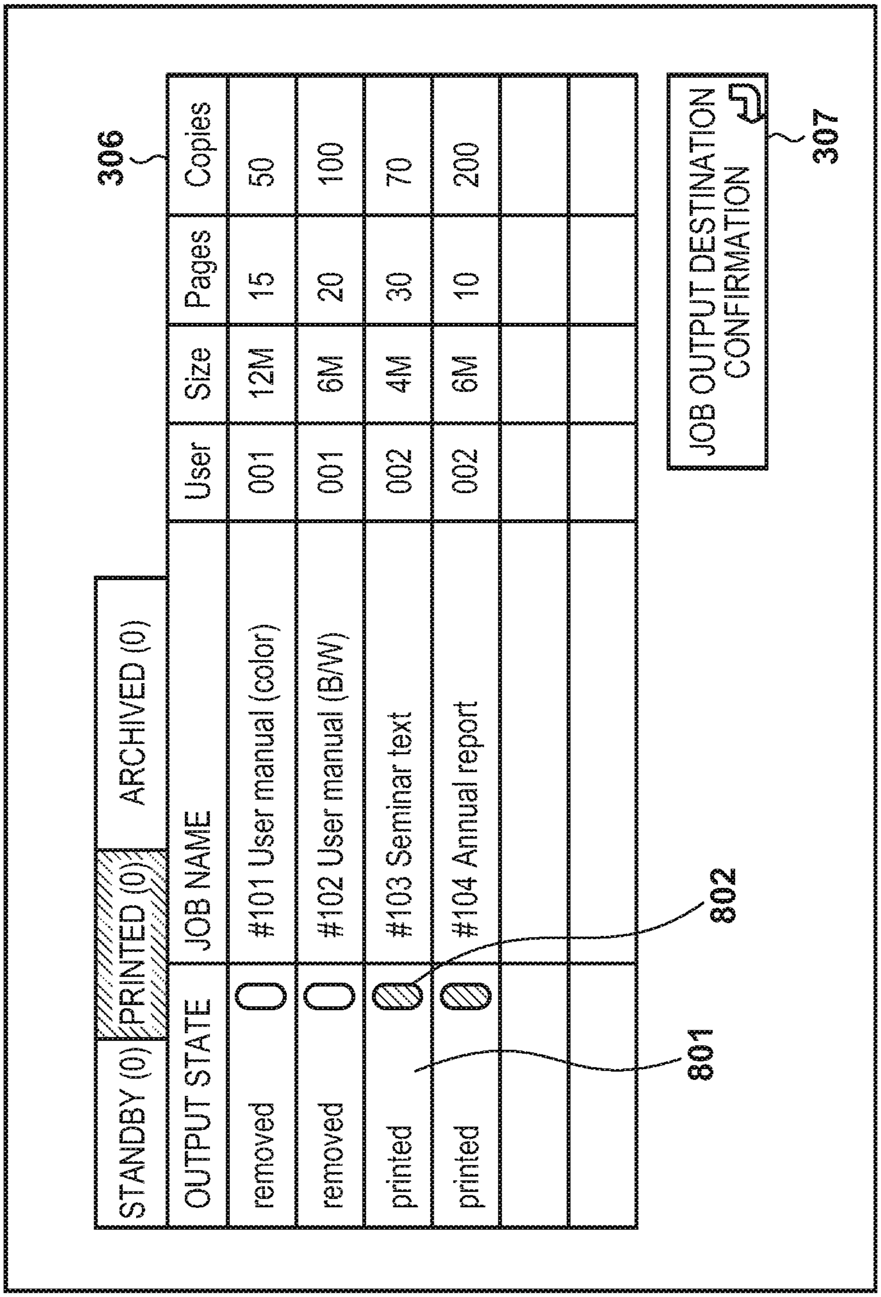
FIG. 8 is a view showing the operation screen of print job management software.

FIG. 8 is a view showing the operation screen of the print job management software 301 according to this embodiment. The difference from the printed job list 306 displayed on the operation screen of the print job management software 301 shown in FIG. 3 will be explained below. As shown in FIG. 8, a plurality of printed jobs are displayed in a printed job list 306. A printed job 801 has a name "#103 Seminar text". An output destination confirmation indicator 802 is also displayed for the printed job 801. If the user of the print job management software 301 presses a job output destination confirmation button 307, the output destination confirmation indicator 802 starts to flicker in the same flickering pattern as that of the indicator light unit 101.

Figure 9:
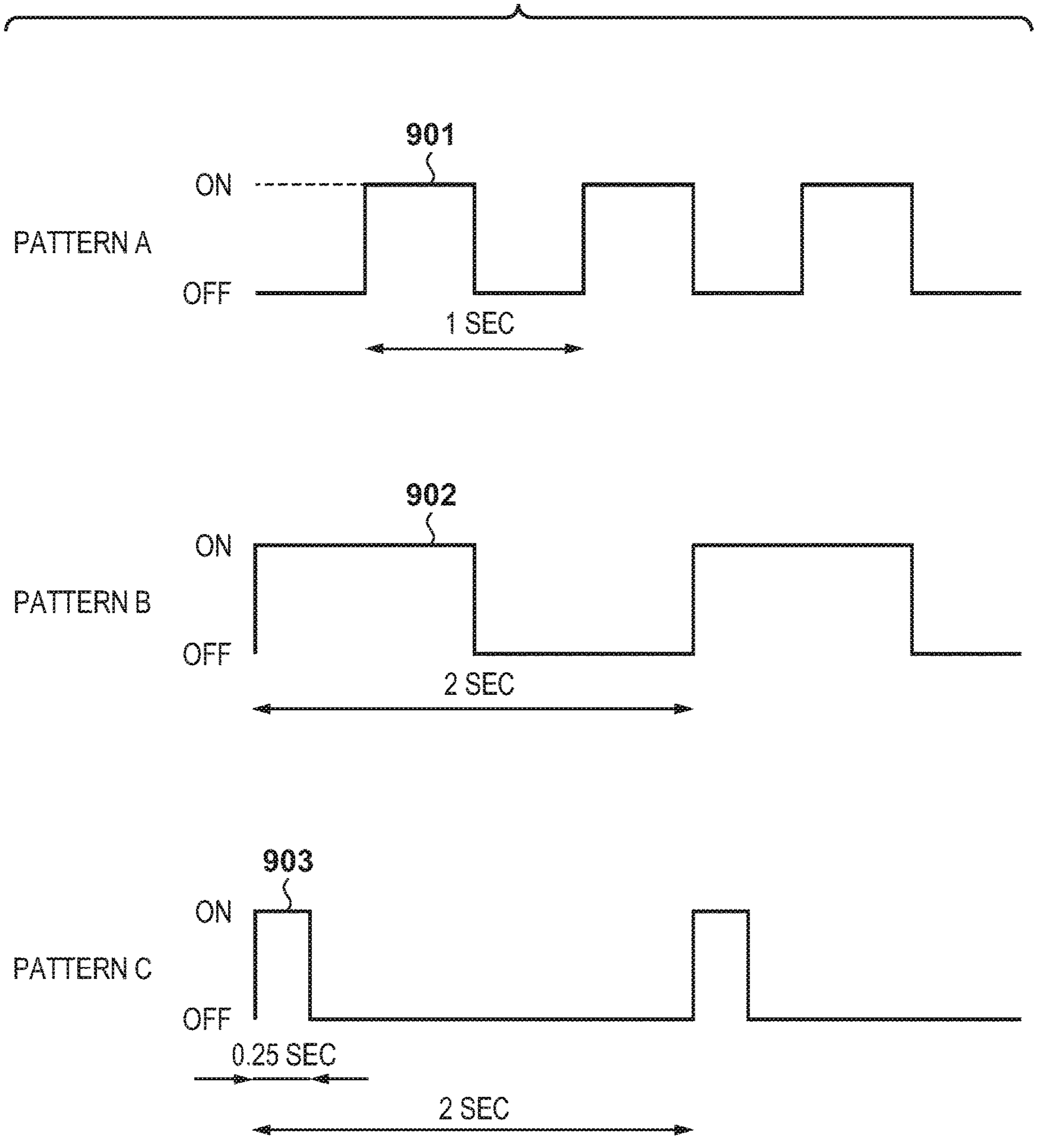
FIG. 9 is a view showing flickering patterns of an indicator light unit and an output destination confirmation indicator.

FIG. 9 is a view showing examples of the flickering pattern of the indicator light unit 101 and the output destination confirmation indicator 802. Pattern A is a pattern of an ON time of 0.5 sec and an OFF time of 0.5 sec at an interval of 1 sec. Pattern B is a pattern of an ON time of 1 sec and an OFF time of 1 sec at an interval of 2 sec. Pattern C is a pattern of an ON time of 0.25 sec at an interval of 2 sec. In this embodiment, even if a plurality of users perform confirmation at the same time, they can reliably find printers that they are searching for, by determining the above-described pattern for each user who performs job output destination confirmation. Note that the flickering pattern is not limited to the above three patterns. It may be possible to support an environment in which there are a number of users, by increasing the number of arbitrary patterns.

Figure 10:
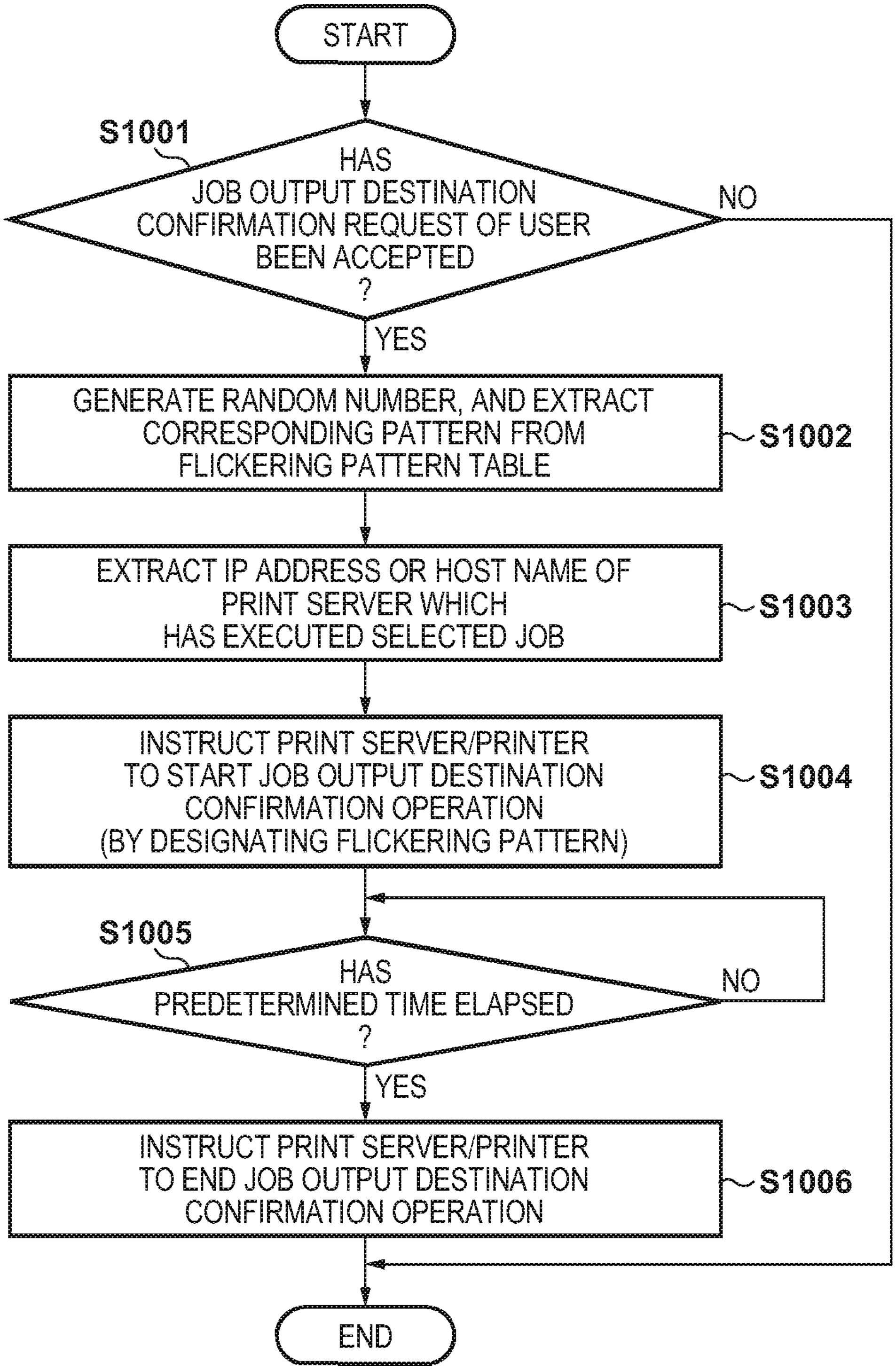
FIG. 10 is a flowchart illustrating job output destination confirmation processing.

The job output destination confirmation processing of the print job management software 301 according to this embodiment will be described with reference to FIG. 10. Each process of FIG. 10 is implemented when a CPU 241 of a client computer 103 reads out a program stored in an HDD 244 into a RAM 243 and executes the program.

A UI control unit 425 determines whether a job output destination confirmation request issued in response to the pressing of a job output destination confirmation button 307 by the user has been accepted (step S1001). If it is determined that a job output destination confirmation request has been accepted, a job output destination search unit 424 generates a random number using, for example, the current time. The job output destination search unit 424 selects and extracts a flickering pattern from a flickering pattern table (not shown) based on the random number (step S1002). The flickering pattern table specifies a combination of a plurality of ON and OFF timings, as shown in FIG. 9. The flickering pattern table may be stored in advance in a storage area, such as a ROM 242.

A print server management unit 421 searches for the network address or a host name of a print server 102 that holds a job selected by the user (step S1003). The job output destination search unit 424 instructs the found network address to perform a job output destination confirmation operation (step S1004). At this time, the job output destination confirmation operation instruction is added with the flickering pattern extracted in step S1002. Table 2 shows examples of the command of the job output destination confirmation operation instruction transmitted via a local network 105. As shown in Table 2, the colors of indicator LEDs 231 and ON/OFF time for each buzzer are designated.

TABLE 2

| Offset | Value | Meaning |
|---|---|---|
| 0x00 | 0x1000 | update of indication of indicator light unit |
| 0x02 | 0(off)/1(on)/2(flickering) | green LED state |
| 0x04 | 0 to 1,000 (per 0.01 sec) | green LED ON time (flickering) |
| 0x08 | 0 to 1,000 (per 0.01 sec) | green LED OFF time (flickering) |
| 0x0a | 0 to 999 | repetition count |
| 0x0c | 0(off)/1(on)/2(flickering) | green LED state |
| 0x0e | 0 to 1,000 (per 0.01 sec) | yellow LED ON time (flickering) |
| 0x10 | 0 to 1,000 (per 0.01 sec) | yellow LED OFF time (flickering) |
| 0x12 | 0 to 999 | repetition count |
| 0x14 | 0(off)/1(on)/2(flickering) | green LED state |
| 0x16 | 0 to 1,000 (per 0.01 sec) | red LED ON time (flickering) |
| 0x18 | 0 to 1,000 (per 0.01 sec) | red LED OFF time (flickering) |
| 0x1a | 0 to 999 | repetition count |
| 0x1c | 0(off)/1(on)/2(intermittence) | buzzer state |
| 0x1e | 0 to 1,000 (per 0.01 sec) | buzzer ON time (intermittence) |
| 0x20 | 0 to 1,000 (per 0.01 sec) | buzzer OFF time (intermittence) |
| 0x22 | 0 to 999 | repetition count |

Steps S1005 and S1006 are the same as steps S704 and S705 of FIG. 7, and a description thereof will be omitted.

As described above, in this embodiment, even if a plurality of users perform job output destination confirmation at the same time, they can more readily identify their selected printers by using different flickering methods of the indicator light unit 101 for the respective users.

Third Embodiment

In the first and second embodiments, if the user of the print job management software 301 instructs a job output destination confirmation operation, the indicator light unit 101 connected to a corresponding printer responds to the instruction. A form in which, if an output paper sheet (printout) has already been removed from a printer 100, the user can know, before going to the printer 100, that the output paper sheet has been removed, will be described below.

Figure 11:
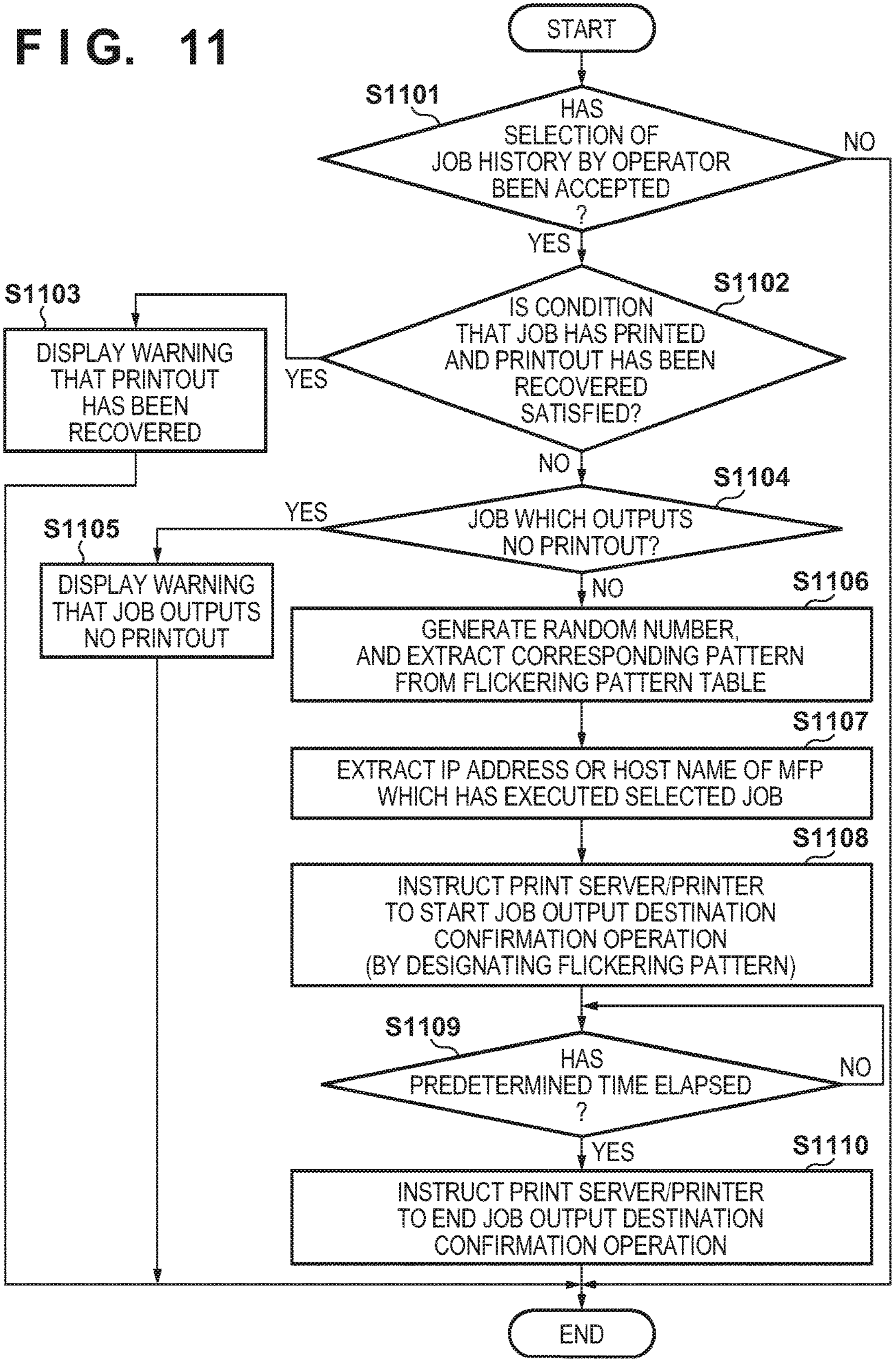
FIG. 11 is a flowchart illustrating job output destination confirmation processing.

The job output destination confirmation processing of print job management software 301 according to this embodiment will be described with reference to FIG. 11. Each process of FIG. 11 is implemented when a CPU 241 of a client computer 103 reads out a program stored in an HDD 244 into a RAM 243 and executes the program.

A UI control unit 425 determines whether a job output destination confirmation request issued in response to the pressing of a job output destination confirmation button 307 by the user has been accepted (step S1101). A print job management unit 422 determines whether the condition that a selected job has output a printed product and the printout has been recovered is satisfied (step S1102). Whether the printout has been recovered is detected by the print job management unit 422. If it is determined that the condition is satisfied, the UI control unit 425 displays, on a display 252, a warning that the printout has already been removed from an output tray (step S1103). FIG. 12A is a view showing an example of a warning screen displayed on the display 252. As shown in FIG. 12A, information indicating that the printout of the selected job has already been removed is displayed, and the user can recognize the information.

If it is determined in step S1102 that the condition is not satisfied, the print job management unit 422 determines whether the selected job is a job that outputs no printout (step S1104). The job that outputs no printout is a box print job for designating a box in an HDD 204 of the printer as an output destination, and saving data in the box. In box printing, the printer 100 saves, in a box, as a file, image data transmitted by a print server 102, and the user can reprint data from an operation unit 214 of the printer 100. That is, if the output destination of the job selected by user is a box, the printer outputs no printout when the data is saved in the box. If it is determined in step S1104 that the job is a job that outputs no printout, the UI control unit 425 displays a warning on the display 252 to prevent the user from going to get a printout inadvertently (step S1105). FIG. 12B is a view showing an example of a warning screen displayed on the display 252. As shown in FIG. 12B, information indicating that the selected job does not print and print data is saved in the printer 100 is displayed, and the user can recognize the information.

If it is determined in step S1104 that the job is not a job that outputs no printout, the process advances to step S1106. Processes in steps S1106 to S1110 are the same as those in steps S1002 to S1006 of FIG. 10 and a description thereof will be omitted.

As described above, according to this embodiment, if an output paper sheet has already been removed from the printer 100, the user can know, before going to the printer 100, that the output paper sheet has been removed. As a result, the user can recognize, at an early stage, the possibility that a user other than the user who has input the job has inadvertently removed the printed product. If the job is a job that outputs no printout, a message indicating it is displayed, thereby making it possible to prevent the user from going to the printer 100 to get the printout inadvertently.

In each of the above embodiments, the form in which the client computer 103 controls indication of the indicator light unit 101 connected to the printer 100 has been explained. The print server 102 may, however, control indication of the indicator light unit 101. That is, the operation of each embodiment is applicable to an arrangement in which the printer 100 for outputting a printed product and the indicator light unit 101 have a one-to-one correspondence.

Furthermore, the form in which the print job management software 301 operates on the client computer 103 has been explained. The print job management software 301 may, however, be made to operate on the print server 102 by connecting a display and keyboard.

In addition, each embodiment has described the form in which the printer 100 and the print server 102 are separated and connected via the network. The printer 100 and the print server 102 may, however, be formed by a single housing by incorporating the function of the print server 102 in the printer 100.

Figure 13A:
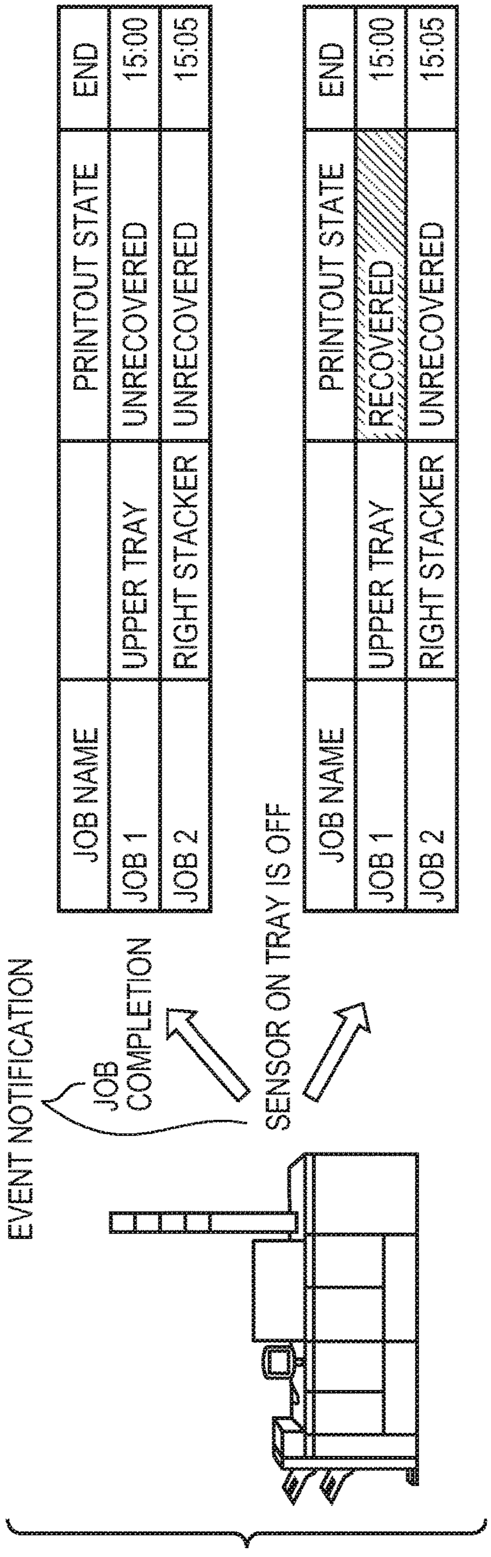
FIGS. 13A and 13B are views each showing the operation screen of print job management software.

FIGS. 8, 12A, and 12B respectively show examples of the operation screen of the print job management software 301. A printer state change notification unit 403 of the printer 100 always monitors a change in state of the printer 100. For example, the printer state change notification unit 403 can acquire the stacked sheet amount on the tray by a sensor on the tray. The print job management software 301 of the client computer 103 can acquire, via the print server 102, an event notification indicating, for example, removal of a sheet. Therefore, as shown in FIG. 13A, an output tray name item and a printout state item may be displayed on the operation screen of the print job management software 301 in association with a job. For example, the operation screen may be configured so that if a sheet is removed, the printout state item changes from "unrecovered" to "recovered". This can give the user a warning that the printout may have been removed erroneously.

Figure 13B:
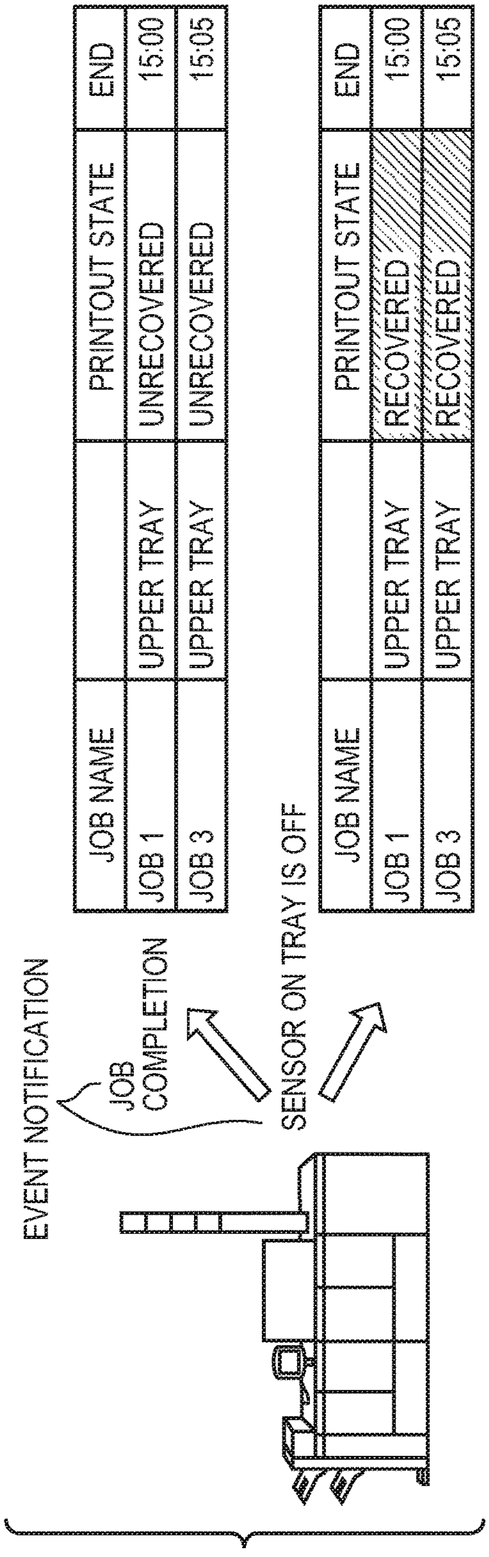

For example, in a case in which the printouts of different jobs are stacked on the same tray, if the print job management software 301 acquires an event notification of sheet removal from the printer 100, it can be determined that the plurality of job outputs have been removed at once. In this case, the operation screen of the print job management software 301 can be configured so that the printout state items for the plurality of jobs change from "unrecovered" to "recovered", as shown in FIG. 13B.

Processing in which the printer 100 detects that sheets on the output tray have been removed will now be described. FIG. 14 is a flowchart illustrating processing of detecting that sheets on the output tray in the printer 100 have been removed. Each process of FIG. 14 is implemented when a CPU 201 reads out a program stored in a ROM 202 into a RAM 203 and executes the program.

In step S1401, the CPU 201 determines whether a job currently executed has changed. This determination processing may be periodically performed for every predetermined time. If it is determined that the job currently executed has changed, the process advances to step S1402. Otherwise, the process advances to step S1404.

In step S1402, the CPU 201 determines whether the job has ended. If it is determined that the job has ended, the process advances to step S1403. Otherwise, the process advances to step S1404. In step S1403, the CPU 201 notifies the print server 102 of a job end event.

In step S1404, the CPU 201 determines whether removal of sheets has been confirmed for all output trays. If it is determined that removal of sheets has been confirmed for all the output trays, the processing of FIG. 14 end. Otherwise, the process advances to step S1405 by setting one output tray as a confirmation target.

In step S1405, the CPU 201 determines whether the detection state of the sheet sensor on the output tray as a confirmation target has changed. If it is determined that the detection state has changed, the process advances to step S1406. Otherwise, the processes are repeated from step S1404.

In step S1406, the CPU 201 determines whether the sheet sensor is OFF. If it is determined that the sheet sensor is OFF, that is, if the existence of sheets is not detected, the process advances to step S1407. Otherwise, the processes are repeated from step S1404.

In step S1407, the CPU 201 notifies the print server 102 of an event that sheets on the output tray have been removed. The CPU 201 sets, in step S1408, the next output tray as a confirmation target, and repeats the processes from step S1404.

Figure 15:
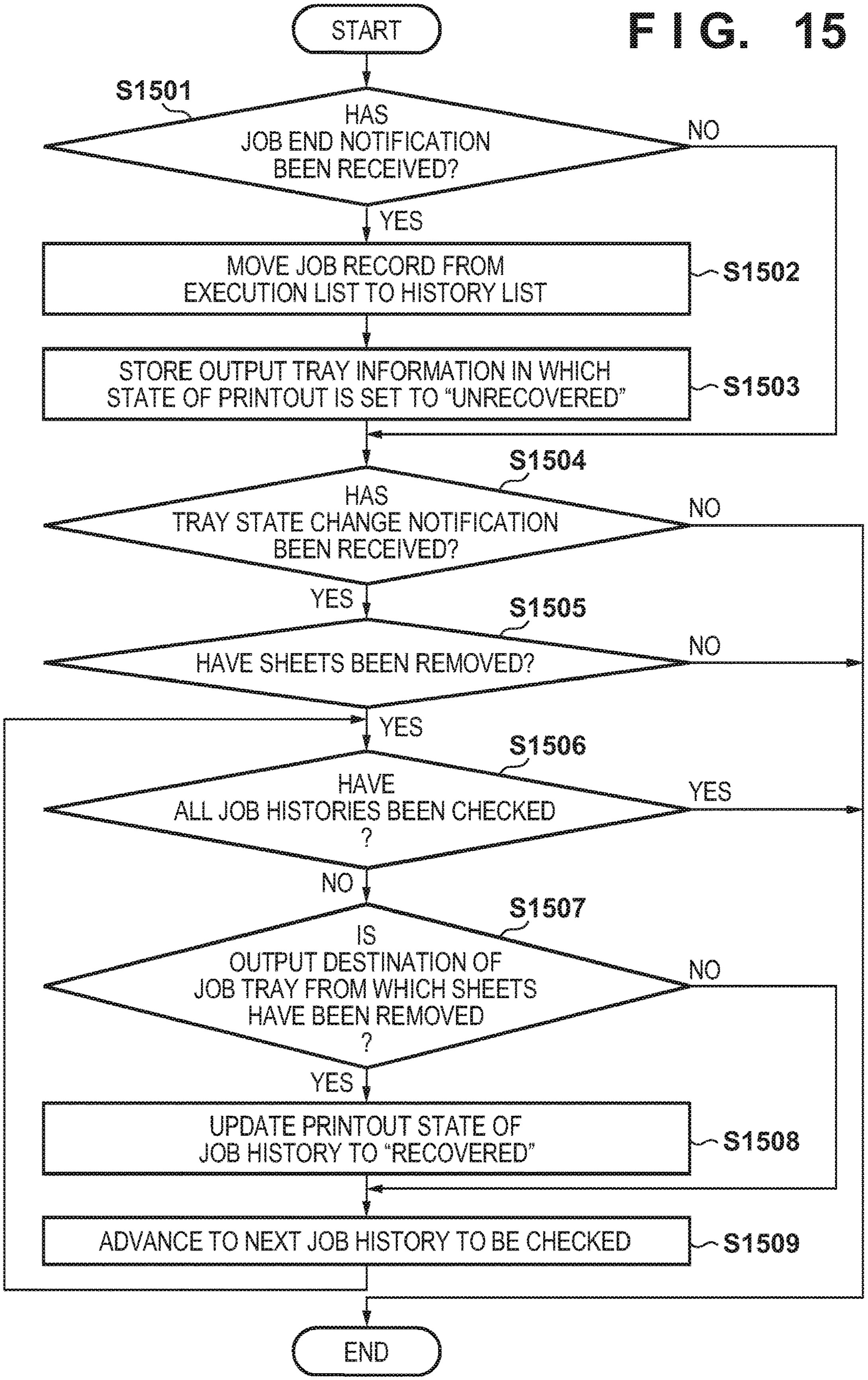
FIG. 15 is a flowchart illustrating the display processing of the operation screen of the print job management software.

FIG. 15 is a flowchart illustrating processing of controlling display of the printout state items of the print job management software 301. Each process of FIG. 15 is implemented when the CPU 241 reads out a program stored in a ROM 242 into the RAM 243 and executes the program. In step S1501, the CPU 241 determines whether a job end event notification has been received from the printer 100. If it is determined that a job end event notification has been received, the process advances to step S1502. Otherwise, the process advances to step S1504.

In step S1502, the CPU 241 moves a job record corresponding to the job end event notification from an execution list to a history list. In step S1503, the output tray information in which the state of the printout is set to "unrecovered" is stored.

In step S1504, the CPU 241 determines whether an output tray state change event notification has been received from the printer 100. If it is determined that an output tray state change event notification has been received, the process advances to step S1505. Otherwise, the processing of FIG. 15 ends.

In step S1505, the CPU 241 determines whether the event notification indicates that sheets on the output tray have been removed. If it is determined that the event notification indicates that sheets on the output tray have been removed, the process advances to step S1506. Otherwise, the processing of FIG. 15 ends.

In step S1506, the CPU 241 determines whether all job histories have been checked. If it is determined that all the job histories have been checked, the processing of FIG. 15 ends. Otherwise, the process advances to step S1507.

In step S1507, the CPU 241 determines whether the output destination of the job is the output tray from which the sheets have been removed. If it is determined that the output destination is the output tray from which the sheets have been removed, the process advances to step S1508. Otherwise, the process advances to step S1509.

In step S1508, the CPU 241 updates the printout state item of the job history to "recovered". In step S1509, the CPU 241 specifies a job history to be checked next, and repeats the processes from step S1506.

Each of the above-described embodiments has explained the example in which job selection by the user is accepted on the operation screen of the print job management software 301. Instead of selecting a job, however, a printer may be selected from a printer list, thereby flickering the indicator light unit 101 in a predetermined flickering pattern. With this arrangement, when searching for a printer at the time of maintenance, the user can readily search for the printer.

Other Embodiments

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A system comprising one or more image forming apparatuses and a control apparatus configured to control the one or more image forming apparatuses, (A) the control apparatus including:
  (a) at least one memory device that stores a set of instructions; and
  (b) at least one processor that executes instructions, of the set of instructions:
    (i) to receive a selection of a job from a job list indicating one or more jobs that are executed by the one or more image forming apparatuses;
    (ii) to specify destination information corresponding to the selected job, among one or more pieces of destination information; and
    (iii) to transmit control information, based on the specified destination information, to an image forming apparatus, of the one or more image forming apparatuses, corresponding to the selected job, to control an indicating pattern of an indicator light connected to the image forming apparatus corresponding to the selected job; and
(B) the image forming apparatus including:
  (a) at least one memory device that stores a set of instructions; and
  (b) at least one processor that executes instructions, of the set of instructions:
    (i) to receive the control information transmitted from the control apparatus; and
    (ii) to control the indicating pattern of the indicator light connected to the image forming apparatus.

2. The system according to claim 1, wherein the image forming apparatus further includes (c) a storage, and the at least one processor of the image forming apparatus further executes instructions, of the set of instructions:
  (iii) to hold information indicating a display state of the indicator light in the storage; and
  (iv) to perform a control operation to turn the indicator light on in a predetermined pattern based on the information indicating the display state of the indicator light stored in the storage.

3. The system according to claim 2, wherein the at least one processor of the control apparatus further executes instructions, of the set of instructions, (iv) to transmit end information indicating an end of identification of the image forming apparatus, and the at least one processor of the image forming apparatus further executes instructions, of the set of instructions:
  (v) to receive the end information transmitted from the control apparatus; and
  (vi) to perform, if the end information is received, a control operation to turn the indicator light off based on the information held in the storage.

4. The system according to claim 1, wherein the at least one processor of the image forming apparatus further executes instructions, of the set of instructions, (iii) to control, if the control information and end information indicating an end of identification of the image forming apparatus are not received, the indicating pattern of the indicator light based on a state of the image forming apparatus.

5. The system according to claim 1, wherein the control information contains information indicating a flickering pattern of the indicator light.

6. The system according to claim 5, wherein the at least one processor of the control apparatus further executes instructions, of the set of instructions, (iv) to transmit, if a first job and a second job are selected, first control information corresponding to the first job and second control information corresponding to the second job, and
  wherein a flickering pattern indicated by information contained in the first control information is different from a flickering pattern indicated by information contained in the second control information.

7. The system according to claim 5, wherein the at least one processor of the control apparatus further executes instructions, of the set of instructions, (iv) to decide information indicating a flickering pattern of the indicator light to be contained in the control information.

8. The system according to claim 7, wherein the control apparatus further includes (c) a table that specifies a plurality of flickering patterns, and the at least one processor of the control apparatus further executes instructions, of the set of instructions, (v) to decide, based on a random number, a flickering pattern of the indicator light to be contained in the control information from the plurality of flickering patterns.

9. The system according to claim 1, wherein the control apparatus further includes (c) a first display that displays, if a job is selected, a user interface representing a flickering pattern of the indicator light in association with the selected job.

10. The system according to claim 1 wherein the at least one processor of the control apparatus further executes instructions, of the set of instructions:
  (iv) to determine, if the selected job is a printed job, whether a printed product has been recovered from the image forming apparatus; and
  (v) to display, if the at least one processor of the control apparatus determines that the printed product has been recovered, that the printed product has been recovered.

11. The system according to claim 1, wherein the at least one processor of the control apparatus further executes instructions, of the set of instructions:

(iv) to determine whether the selected job is a job that outputs no printed product; and (v) to display, if the at least one processor of the control apparatus determines that the job is a job that outputs no printed product, information indicating that the job is a job that outputs no printed product.

12. The system according to claim 1, wherein the job is a job that has output a printed product to a tray of the image forming apparatus.

13. The system according to claim 12, wherein the job is a job whose printed product has not been recovered from the tray of the image forming apparatus.

14. The system according to claim 1, wherein the at least one processor of the control apparatus further executes instructions, of the set of instructions, (iv) to search for an image forming apparatus, of the one or more image forming apparatus, to which a printout of the elected print job is output.

15. The system according to claim 1, further comprising (C) one or more print servers connected to each of the one or more image forming apparatuses, wherein the control apparatus and each image forming apparatus communicate with each other via the corresponding print server, of the one or more print servers, and wherein the specified destination information indicates an address of the print server connected to the image forming apparatus to which the selected print job is output.

16. The system according to claim 1, wherein the indicating pattern is determined based on a random number.

17. A control apparatus for controlling one or more image forming apparatuses, the control apparatus comprising:

(A) at least one memory device that stores a set of instructions; and (B) at least one processor that executes instructions, of the set of instructions:

(a) to receive a selection of a job from a job list indicating one or more jobs that are executed by the one or more image forming apparatuses;

(b) to specify destination information corresponding to the selected job, among one or more pieces of destination information; and (c) to transmit control information, based on the specified destination information, to an image forming apparatus, of the one or more image forming apparatuses, corresponding to the selected job, to control an indicating pattern of an indicator light connected to the image forming apparatus corresponding to the selected job.

18. A control method executed in a system including one or more image forming apparatuses, and a control apparatus for controlling the image forming apparatus, the control method comprising:

(A) in the control apparatus;

(a) receiving a selection of a job from a job list indicating one or more jobs that are executed by the one or more image forming apparatuses;

(b) specifying destination information corresponding to the selected job, among one or more pieces of destination information; and (c) transmitting control information, based on the specified destination information, to an image forming apparatus, of the one or more image forming apparatuses, corresponding to the selected job, to control an indicating pattern of an indicator light connected to the image forming apparatus corresponding to the selected job; and (B) in the image forming apparatus;

(a) receiving the control information transmitted from the control apparatus; and (b) controlling the indicating pattern of the indicator light connected to the image forming apparatus.

19. A control method executed in a control apparatus for controlling one or more image forming apparatuses, the control method comprising:

receiving a selection of a job from a job list indicating one or more jobs that are executed by the one or more image forming apparatuses;

specifying destination information corresponding to the selected job, among one or more pieces of destination information; and transmitting control information, based on the specified destination information, to an image forming apparatus, of the one or more image forming apparatuses, corresponding to the selected job, to control an indicating pattern of an indicator light connected to the image forming apparatus corresponding to the selected job.

20. A system comprising an information processing apparatus and a plurality of image forming apparatuses connected to the information processing apparatus, (A) the information processing apparatus including:

(a) at least one memory device that stores a set of instructions; and (b) at least one processor that executes instructions, of the set of instructions:

(i) to receive a selection of a print job from a print job list;

(ii) to specify destination information corresponding to the selected print job, among one or more pieces of destination information; and (iii) to transmit control information, based on the specified destination information, to at least one of (1) an image forming apparatus, of the plurality of image forming apparatuses, that stores the selected print job, and (2) an image forming apparatus, of the plurality of image forming apparatuses, that has executed the selected print job; and (B) each image forming apparatus, of the plurality of image forming apparatuses, being connected to an indicator light having an indicating pattern that is switched in accordance with a state of the image forming apparatus, and each image forming apparatus including:

(a) at least one memory device that stores a set of instructions; and (b) at least one processor that executes instructions, of the set of instructions:

(i) to receive the control information transmitted from the information processing apparatus; and (ii) to control the indicating pattern of the indicator light based on the received control information.

21. The system according to claim 20, wherein, in a case in which the image forming apparatus receives the control information, the at least one processor of the one image forming apparatus further executes the instructions (iii) to switch a combination of colors of light emitting units of the indicator light in an ON state to a different combination of colors.

22. The system according to claim 21, wherein the combination of the colors of the light emitting units is a combination of at least two of green, yellow, and red.

23. A system comprising an information processing apparatus and a plurality of image forming apparatuses connected to the information processing apparatus, (A) the information processing apparatus including:

(a) at least one memory device that stores a set of instructions; and (b) at least one processor that executes instructions, of the set of instructions:

(i) to receive a selection of a print job from a print job list;

(ii) to specify destination information corresponding to the selected print job, among one or more pieces of destination information; and (iii) to transmit control information, based on the specified destination information, to one of (1) an indicator light connected to an image forming apparatus, of the plurality of image forming apparatuses, that stores the selected print job, to control an indicating pattern of the indicator light, and (2) an indicator light connected to an image forming apparatus, of the plurality of image forming apparatuses, that has executed the selected print job to control an indicating pattern of the indicator light; and (B) each image forming apparatus, of the plurality of image forming apparatuses, including:

(a) at least one memory device that stores a set of instructions; and (b) at least one processor that executes instructions, of the set of instructions, (i) to control the indicating pattern of one of (1) the indicator light connected to the image forming apparatus that stores the selected print job, and (2) the indicator light connected to the image forming apparatus that has executed the selected print job, based on the received control information.

24. A control method executed in a system including an information processing apparatus and a plurality of image forming apparatuses connected to the information processing apparatus, the control method comprising:

(A) in the information processing apparatus;

(a) receiving a selection of a print job from a print job list;

(b) specifying destination information corresponding to the selected print job, among one or more pieces of destination information; and (c) transmitting control information, based on the specified destination information, to at least one of (1) an image forming apparatus, of the plurality of image forming apparatuses, that stores the selected print job, and (2) an image forming apparatus, of the plurality of image forming apparatuses, that has executed the selected print job; and (B) in each image forming apparatus, of the plurality of image forming apparatuses:

(a) receiving the control information transmitted from the information processing apparatus; and (b) controlling an indicating pattern, based on the received control information, of at least one of (1) an indicator light that is connected to the image forming apparatus that stores the selected print job, and (2) the image forming apparatus that has executed the selected print job, by switching the indicating pattern in accordance with a state of the image forming apparatus.

25. A control method executed in a system including an information processing apparatus and a plurality of image forming apparatuses connected to the information processing apparatus, the control method comprising:

(A) in the information processing apparatus:

(a) receiving a selection of a print job from a print job list;

(b) specifying destination information corresponding to the selected print job, among one or more pieces of destination information; and (c) transmitting control information, based on the specified destination information, to at least one of (1) an indicator light connected to an image forming apparatus, of the plurality of image forming apparatuses, that stores the selected print job to control an indicating pattern of the indicator light, and (2) an indicator light connected to an image forming apparatus, of the plurality of image forming apparatuses, that has executed the selected print job to control an indicating pattern of the indicator light; and (B) in an image forming apparatus, of the plurality of image forming apparatuses:

(a) controlling one of (1) the indicator light connected to the image forming apparatus that stores the selected print job, and (2) the indicator light connected to the image forming apparatus that has executed the selected print job, based on the received control information.

* * * * *